(12) United States Patent
Hanley et al.

(10) Patent No.: US 12,457,468 B2
(45) Date of Patent: Oct. 28, 2025

(54) CHARACTERIZING LOCALIZED NATURAL AREAS AND INDIVIDUAL EXPOSURE

(71) Applicant: NatureQuant, LLC, Eugene, OR (US)

(72) Inventors: Jared Hanley, Eugene, OR (US); Christopher Robinson Bailey, Bend, OR (US); Christopher Todd Minson, Eugene, OR (US)

(73) Assignee: NatureQuant, LLC, Eugene, OR (US)

( * ) Notice: Subject to any disclaimer, the term of this patent is extended or adjusted under 35 U.S.C. 154(b) by 778 days.

(21) Appl. No.: 17/757,014

(22) PCT Filed: Dec. 9, 2020

(86) PCT No.: PCT/US2020/063877
§ 371 (c)(1),
(2) Date: Jun. 8, 2022

(87) PCT Pub. No.: WO2021/119047
PCT Pub. Date: Jun. 17, 2021

(65) Prior Publication Data
US 2023/0016183 A1 Jan. 19, 2023

Related U.S. Application Data

(60) Provisional application No. 63/051,400, filed on Jul. 14, 2020, provisional application No. 62/946,015, filed on Dec. 10, 2019.

(51) Int. Cl.
*G06N 5/04* (2023.01)
*G06V 10/82* (2022.01)
*H04W 4/021* (2018.01)

(52) U.S. Cl.
CPC .............. *H04W 4/021* (2013.01); *G06N 5/04* (2013.01); *G06V 10/82* (2022.01)

(58) Field of Classification Search
CPC ....... H04W 4/021; H04W 4/029; H04W 4/38; G06N 5/04; G06V 10/82; G06F 18/24137
See application file for complete search history.

(56) References Cited

U.S. PATENT DOCUMENTS 6,590,529 B2    7/2003   Schwoegler
6,693,546 B2    2/2004   Skardon
(Continued)

FOREIGN PATENT DOCUMENTS

WO    WO 2017/042682 A1    3/2017
WO    WO 2019/046580 A1    3/2019

OTHER PUBLICATIONS

Hanley et al., International Search Report & Written Opinion for PCT Application No. PCT/US2020/063877, dated Apr. 15, 2021 (8 pages) (Year: 2021).

*Primary Examiner* — Jorge A Casanova
(74) *Attorney, Agent, or Firm* — Jeff Klembczyk, Esq.; Kevin P. Radigan, Esq.; Heslin Rothenberg Farley & Mesiti P.C.

(57) ABSTRACT

A method implemented in a computing device is provided, which includes collecting nature information proximate a location, and providing an output to a user characterizing the quantity, quality, and/or type of nature areas and/or elements proximate the location. In an enhanced embodiment, a method implemented in a computing device is provided which includes collecting information about the location and character of a user's activities, and providing a dynamic output to the user to dynamically monitor the quantity and quality of an individual's exposure to natural areas.

20 Claims, 10 Drawing Sheets

(56) References Cited

U.S. PATENT DOCUMENTS

| | | |
|---|---|---|
| 7,212,922 B1 | 5/2007 | Longacre et al. |
| 7,383,130 B1 | 6/2008 | Koosam |
| 7,818,142 B2 | 10/2010 | Schuler et al. |
| 8,606,497 B2 | 12/2013 | Doherty et al. |
| 8,793,212 B2 | 7/2014 | McGuire |
| 9,008,389 B2 | 4/2015 | Williams |
| 10,096,227 B2 | 10/2018 | Iwang et al. |
| 10,998,101 B1* | 5/2021 | Tran ............... G16H 50/30 |
| 11,056,242 B1* | 7/2021 | Jain ............... G16H 10/60 |
| 11,456,080 B1* | 9/2022 | Jain ............... A61B 5/4815 |
| 2005/0197903 A1* | 9/2005 | Hoffman ........... G06Q 30/02 |
| | | 705/2 |
| 2008/0146892 A1* | 6/2008 | LeBoeuf ........... A61B 5/4812 |
| | | 600/300 |
| 2009/0089169 A1* | 4/2009 | Gupta ............... G06Q 30/02 |
| | | 705/14.69 |
| 2009/0316671 A1* | 12/2009 | Rolf ............... H04W 4/029 |
| | | 370/338 |
| 2014/0278139 A1* | 9/2014 | Hong ............... A61B 5/1118 |
| | | 702/19 |
| 2016/0095188 A1 | 3/2016 | Verberkt et al. |
| 2016/0117372 A1 | 4/2016 | Krafft |
| 2016/0196493 A1 | 7/2016 | Glynn |
| 2016/0210839 A1* | 7/2016 | Yadav ............... G08B 13/19613 |
| 2018/0325422 A1* | 11/2018 | Sokol ............... A62B 7/10 |
| 2018/0344215 A1 | 12/2018 | Ohnemus et al. |
| 2019/0370089 A1 | 12/2019 | Patton et al. |

\* cited by examiner

GREEN SCORE
FIND OUT HOW GREEN THE AREA IS AROUND A GIVEN LOCATION

SELECTED LOCATION GREEN ZONE:

LOCATION:
1626 SW ELIZABETH ST. PORTLAND, OR 97201, USA (45.5072604345264, -122.69617080688478)

SCORE:
52 (INNER COVERAGE: 15.9%, OUTER COVERAGE: 20.4%)

GREEN AREAS USED IN SCORE:

- MARQUAM NATURE PARK
- GOVERNORS PARK
- HEALY HEIGHTS PARK
- COUNCIL CREST PARK
- PORTLAND HEIGHTS PARK
- WILLIAMETTE RIVER

CHARACTERIZING LOCALIZED NATURAL AREAS AND INDIVIDUAL EXPOSURE

CROSS-REFERENCE TO RELATED APPLICATIONS

This application is a National Stage filing under $371 of International Application No. PCT/US2020/063887, filed Dec. 9, 2020, and published on Jun. 17, 2021, as WO 2021/119047 A1. In addition, this application claims the benefit of U.S. Patent Application Ser. No. 62/946,015, filed Dec. 10, 2019, entitled "Method and System for Characterizing Localized Natural Areas and Monitoring the Quantity and Quality of an Individual's Exposure to Natural Areas", as well as U.S. Patent Application Ser. No. 63/051,400, filed Jul. 14, 2020, entitled "Method and System for Characterizing Localized Natural Areas and/or Elements and Monitoring the Quantity and Quality of an Individual's Exposure to Natural Areas and/or Elements", which are hereby incorporated herein by reference in their entirety.

TECHNICAL FIELD

The present invention relates to a method and system for determining the type, quality, and quantity of natural areas and/or elements proximate a given location, and dynamically monitoring and interpreting a user's exposure to natural areas and/or elements.

BACKGROUND OF THE INVENTION

Humans are increasingly disconnected from nature. Most people—over half globally, and approximately four in five Americans—live in urban areas, where nature contact is typically limited (United Nations 2015). Surveys reveal that Americans spend >90% of their time indoors, with most of that time spent in buildings, and a smaller portion in vehicles (Klepeis et al. 2001). Screen time has reached daily averages of nearly 11 hours in the U.S. (Nielsen 2016). Park visitation, hunting, fishing, camping, and children's outdoor play have all declined substantially over recent decades (Clements 2004; Frost 2010; Pergams and Zaradic 2008).

Additional findings include:

According to the EPA Americans now spend 93% of their lives indoors; this is counter to 99.9% of human history.

According to the UN, today 55% of the world's population lives in urban area. This number is expected to grow to two-thirds of the world's population by 2050.

Adult Americans on average spend over 11 hours a day in front of screens.

Depression, anxiety, heart disease and obesity have also all grown significantly over the last thirty years.

Illness and all-cause mortality has been linked to time spent indoors.

It has long been noted that human health is markedly affected by environmental conditions.

In this context, recent years have seen a blossoming of scientific interest in the benefits of nature contact for human health and well-being. Several recent reviews have summarized and evaluated the growing evidence base (Bowler et al. 2010; Hartig et al. 2014; James et al. 2015; Lee and Maheswaran 2011; Martens and Bauer 2013; Russell et al. 2013; Seymour 2016). This literature reveals an extraordinarily broad range of benefits. One study remarks: "The evolution of the science behind the health benefits of nature today is where we were with exercise 20 years ago."

There is a large and growing body of scientific literature that demonstrates that contact with nature (broadly defined as urban green space, parks, forests, etc.) can lead to measurable psychological and physiological health benefits, as well as numerous other positive effects. FIGS. 1a-b schematically show some exemplary pathways and outcome benefits of nature exposure.

However, few practical tools are available in areas like nature quantification, exposure assessment and tracking, integration of innovative data sources, and otherwise time-consuming analytical techniques. Additionally, we lack consensus around a standard measurement of nature or nature exposure. Finally, at least in the United States, there is limited public promotion or understanding of the benefits of nature.

SUMMARY OF THE INVENTION

Despite this considerable body of evidence, there is no existing technology that quantifies and characterizes natural areas near a designated location, and that can allow an individual, institution (company, school, health care provider, etc.), or government to dynamically track time spent inside versus outside, and if outside, assess the amount and quality of time outside spent in natural areas versus built environments. While the benefits of time in nature are generally accepted, and many doctors are already prescribing "time outside", there is no convenient way to monitor, quantify, motivate, or evaluate time outside in nature. Additionally, there is no standardized definition of what constitutes natural areas and that can delineate the various types of natural areas (tree lined street versus city, park versus national forest, as just several examples).

Therefore, there exists a need for automated scoring of nature exposure quantity, quality and type—both for a singular location, and dynamically for an individual as he/she moves about.

The shortcomings of the prior art are addressed, and additional advantages are provided by the present invention which in one aspect is a method and system for characterizing the quantity, quality and/or type of natural areas and/or elements proximate a location. The quantity, quality and/or type of natural areas and/or elements characterized can be synthesized into a standardized unit of measurement.

The quantity, quality and/or type of natural areas and/or elements characterized may be derived using at least one of (for example): Normalized Difference Vegetation Index, Normalized Difference Water Index, Time/date, Geolocation (e.g., Lat/Long), Nature quality (Park/National Park/Street), Current weather/temp, Difference from thermostatic temp, Atmospheric pressure, Humidity, Cloud cover/rain/snow, Current smog index, AQI (Air Quality Index) e.g., air particulates/pollutants, Light Pollution, Satellite imagery, Vegetation density and type, Location characteristics, Decibel level, and Phytoncides.

In another aspect, the present invention is a method and system for dynamically monitoring the quantity and quality of an individual's exposure to natural areas and/or elements. Static and dynamic data can be collected and used to synthesize a nature dose representing a measure of the quantity and quality of an individual's exposure to natural areas and/or elements.

The static data comprises at least one of (for example): Age, weight, BMI, skin tone, etc.

The dynamic data comprises at least one of (for example): Clothing, glasses, Mental state, heart rate, body temp, energy level, etc., Normalized Difference Vegetation Index, Normalized Difference Water Index, Time/date, Geolocation (e.g., Lat/Long), Nature quality (Park/National Park/Street), Current weather/temp, Difference from thermostatic temp, Atmospheric pressure, Humidity, Cloud cover/rain/snow, Current smog index, AQI (Air Quality Index) e.g., air particulates/pollutants, Light Pollution, Satellite imagery, Vegetation density and type, Location characteristics, Decibel level, Phytoncides, Other health apps (e.g., steps), Activity quality, Meditation guidance, prescriptions, health/fitness recommendations, etc.

The present invention will help refine understanding of the benefits of nature and promote the use of nature as a public health tool. The results of rich data will guide interventions across a wide range of settings, populations, spatial scales, and forms of nature. Individuals, health professionals, ecologists, landscape architects, parks staff, educators, governments, real estate owners, and many others will in turn be able to apply these results to improve health and well-being on a large scale.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter regarded as the invention is particularly pointed out and distinctly claimed at the conclusion of the specification. The foregoing and other objects, features, and advantages of the invention are apparent from the following detailed description taken in combination with the accompanying drawings in which:

DETAILED DESCRIPTION OF THE INVENTION

Figure 1A:
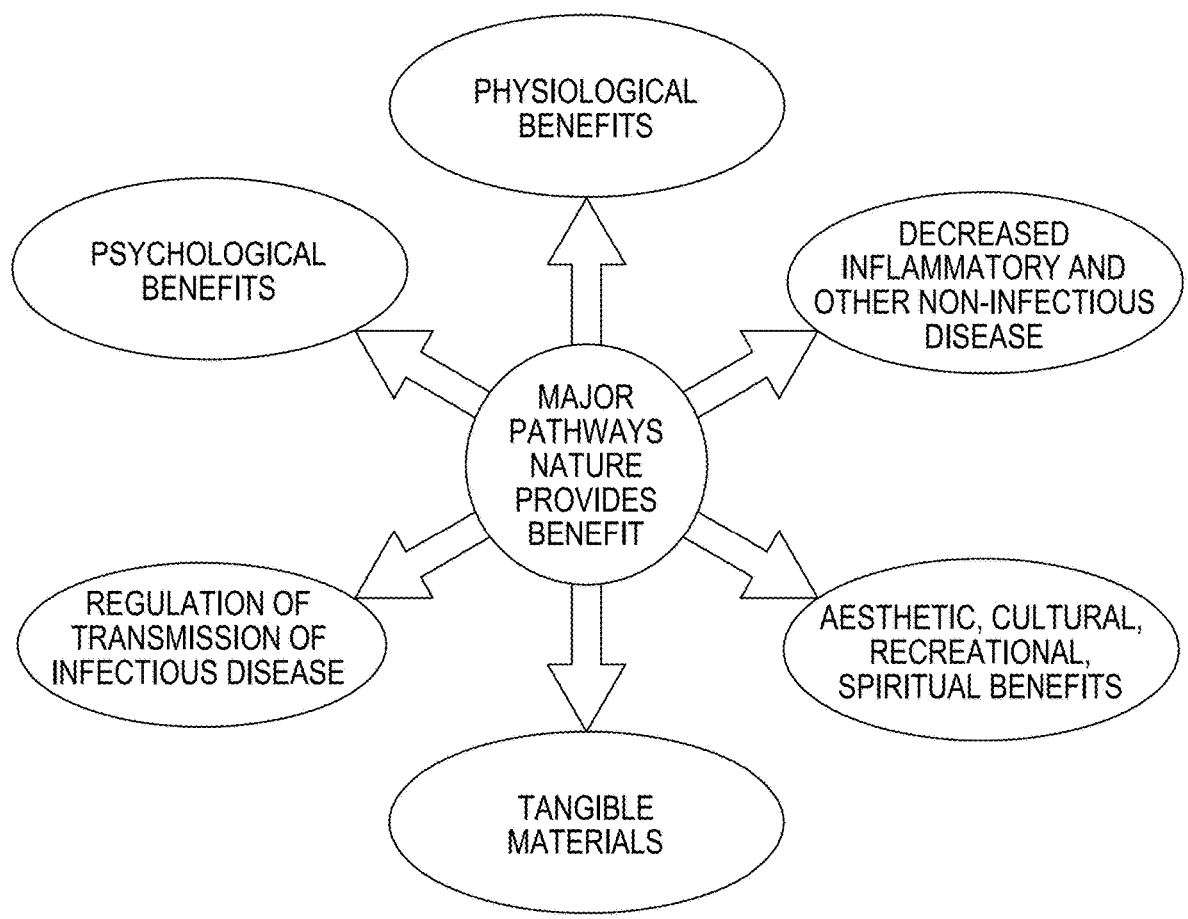
FIGS. 1a-b schematically show some exemplary pathways and outcome benefits of nature exposure, and an exemplary, generic space/time plotting of nature exposure type.

A large and growing body of scientific literature demonstrates that contact with nature (broadly defined as green space, trees, parks, forests, bodies of water, etc.) can lead to measurable psychological and physiological health benefits. Natural areas and elements also have been linked to other positive effects, like improved property values, lower pollution, reduced crime rates, strengthened communities, and slowed viral and bacterial disease transmissions. On par with changes in exercise or diet, nature contact offers promise both as prevention and as treatment of many serious diseases. Additionally, potential advantages of nature exposure include almost zero-cost (relative to conventional medical interventions), safety, and practicality (not requiring individualized attention from highly trained professionals). Few, if any, medications or other interventions can boast these attributes.

The present invention uses an evolving combination of inputs ranging from the immediate surroundings of the human body (10-100 meter buffer), to the neighborhood scale (up to 500 meter buffer), to the regional scale (1,000 m+). The present invention in one aspect achieves this by merging various inputs, including land cover types, vegetation densities, vegetation seasonality, built city elements, and parks and open areas; or the lack of "built environmental hazards" such as air pollution, light pollution, or noise pollution, or other unhealthy man-man hazards. This data is collected from various inputs, including aerial photography, NDVI and NDWI values (the Normalized Difference Vegetation (Water) Index "NDVI" is a graphical indicator from a space platform used to assess whether the observed target contains live green vegetation), various GIS and land classification databases and open street maps, and various object based imagery analysis tools allowing review of aerial and street-level views. Additionally, the present invention considers built environmental pollutions, like air quality, noise pollution, "urban heat islands", and light pollution; or the lack of such "built environmental hazards" such as air pollution, light pollution, or noise pollution, or other unhealthy man-man hazards.

Using dynamic, iterative techniques and machine learning, the present inventors applied the inventive techniques to national health data for over 30,000 census tracts and for the top 500 cities. These techniques yielded powerful positive associations with longevity and negative associations with poor health outcomes (cancer, diabetes, cardiovascular disease, etc.). In short, living in an area with a high level of nature ("GreenScore" or "NatureScore™") is strongly associated with enjoying a longer, healthier life. (Note that NatureScore™ and NatureDose™ used herein are trademarks of Applicant NatureQuant™ LLC, of Eugene, Oregon, USA.)

In one aspect the present invention provides a technology platform to characterize the quantity, quality, and/or type of natural areas and/or elements around a given location (e.g., a location's "GreenScore" or "NatureScore"), and in a related embodiment, to dynamically and qualitatively monitor an individual's exposure to natural areas, including during time outside, both in natural areas and urban areas (e.g., an individual's "nature dose" or "NatureDose™").

The ability to characterize the quantity, quality and/or type of natural areas and/or elements around a given location is beneficial for city planning, real estate evaluation, and other geographic research. The ability to dynamically and qualitatively monitor a user's time in and exposure to nature is beneficial for individual personal fitness and medical goal setting/monitoring, medical research/data analytics, and the "gamification" of time outside.

In another aspect, the invention provides educational and motivation features (via "daily tips" and "scoring systems") and maps/guidance to nearby natural areas.

In certain aspects, the invention can be used as a standalone application, or as a feature within other health and fitness applications/wearables/medical devices/mental health platforms/real estate analysis/government applications.

In certain aspects, the present invention can use location data, GPS, satellite imagery, image databases, weather/ temperature monitoring, and other inputs available from an individual's smartphone or smartwatch, or other individual devices, or the internet/cloud/IOT/other services to determine the amount of time spent inside versus outside. Time spent outside can also be further delineated into natural areas versus built/urban environments, along with other qualitative measurements. UV exposure within time periods and in the aggregate, can also be ascertained.

The results can be synthesized into measurements, possibly termed a general "GreenScore" or "NatureScore" for a given location and/or generally dynamic "NatureDose", of use to the user, and/or institutions (health insurers, health providers, researchers, government, etc.). The term "GreenScore" is broadly used and construed without limitation herein to include actual color "green" nature (trees, leaves, grass) but also items that are more colloquially considered "green" such as mountains, water, desert—i.e., any environments comprising general lack of man-made structures; or the lack of "built environmental hazards" such as air pollution, light pollution, or noise pollution, or other unhealthy man-man hazards. In one commercial embodiment the term/trademark "NatureScore" is under consideration for use describing this score.

Additional features of the present invention include but are not limited to:

Aggregate and percentage of time outside versus indoors.
Aggregate and percentage of time in natural areas.
"NatureDose" and/or "nature ranking".
UV/vitamin D tracking.
Maps to near-by natural areas.
Prescription tracking—health tips.
Data collection for medical research.
Nature type and density for a given radius from a location.

In general, and without limitation, "nature" or "natural" is used herein to connote areas not primarily containing man-made, artificial structures such as buildings, but containing elements of living systems that include plants and nonhuman animals across a range of scales and degrees of human management, from a small urban park through to relatively 'pristine wilderness' (Bratman et al. 2012), together with abiotic elements such as sunset or mountain views, or mixed-use areas such as tree-lined streets.

With regard to interpretation of time spent in nature, the present invention in one aspect can use the data generated to monitor activity, study health impacts, and deliver recommendations to users and institutions. Health is broadly defined, without limitation, to include physical and mental health, social well-being, academic and job performance, and happiness. The effects of nature contact on pro-environmental knowledge, attitudes, and behavior are well developed.

Figure 1B:
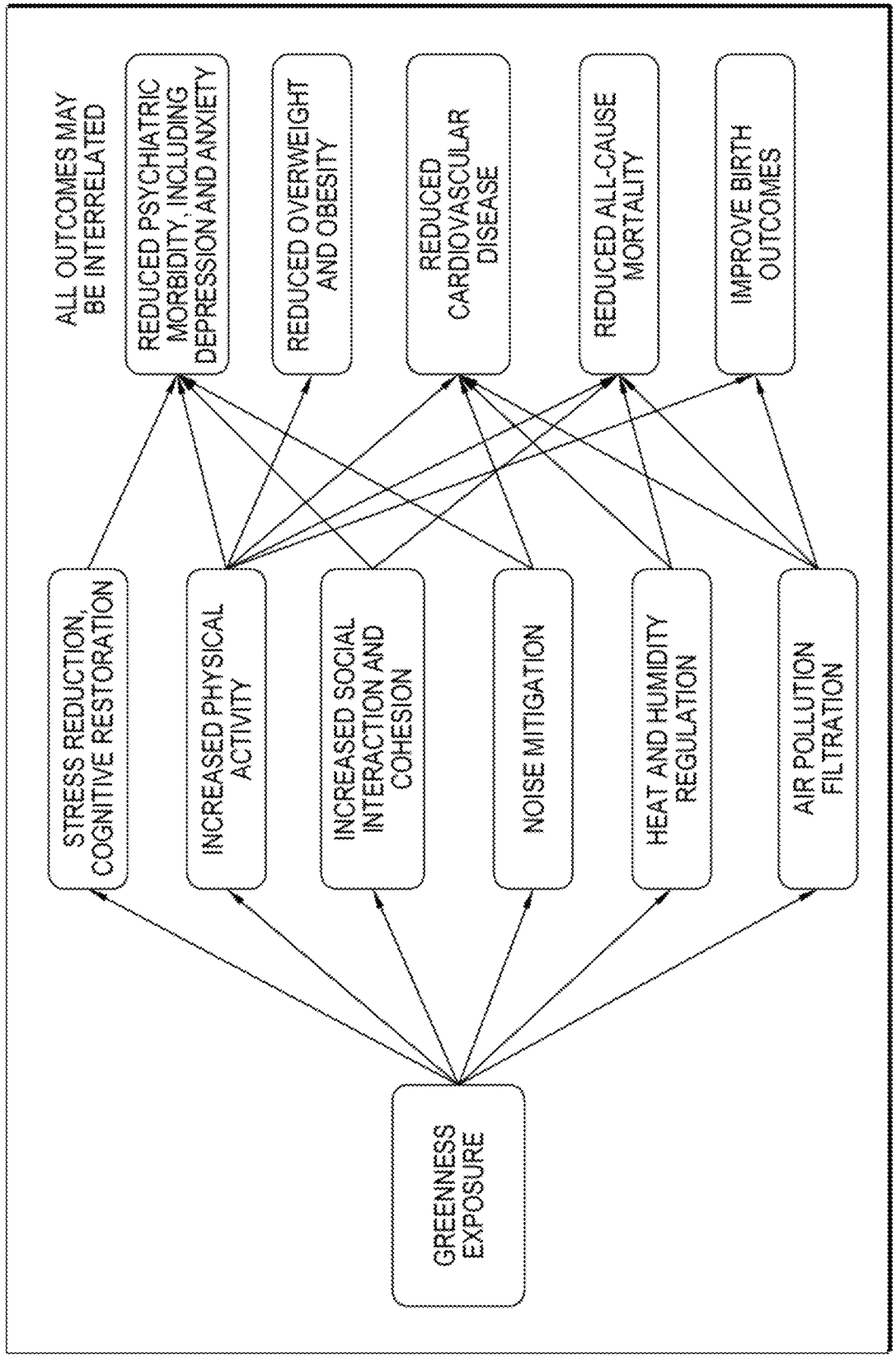

As discussed above and with reference to FIGS. 1a-b, nature contact offers considerable promise in addressing a range of health challenges, including many, such as obesity, cardiovascular disease, depression, and anxiety, which are public health priorities. Nature contact offers promise both as prevention and as treatment across the life course. Potential advantages include low costs relative to conventional medical interventions, safety, practicality, not requiring dispensing by highly trained professionals, and multiple co-benefits. Few medications can boast these attributes. However, particular limitations exist in such areas as exposure assessment, innovative data sources, and analytical techniques. The present invention in one aspect intends to addresses these limitations by providing in one aspect, a generally static measurement referred to herein as a "Green-Score" which describes the localized quantity, quality and/or type of natural area around a given location; and in another aspect a generally dynamic measurement referred to herein as a "nature dose" which describes the quantity, quality, and/or type of natural area exposure encountered by an individual as he/she moves about. The results of such rich data can guide interventions across a wide range of settings, populations, spatial scales, and forms of nature. Health professionals, ecologists, landscape architects, parks staff, educators, and many others will in turn be able to apply these results to improve health and well-being on a large scale.

Greenscore Examples

In accordance with one aspect of the present invention, an example method of determining a GreenScore includes considering aerial images with 1 m×1 m accuracy, which are collected and analyzed to generate pixels of 30 m×30 m. The score for each pixel is, in one example, the percentage of nature areas as opposed to hardscape. Hardscape includes buildings, pavement, and other artificial surfaces. Nature areas include any kinds of trees, grass, shrubs, etc., even bare dirt and bodies of water. Nearby pixels can be interpolated.

A Home/Business location GreenScore can be the average of all data pixels within a 100 m (0.06 mi) radius, roughly the length of a typical short city block. A Neighborhood GreenScore can be the average of data pixels within a 1.5 km (1 mi) radius, and may not be limited by the legal or demographic boundaries of neighborhoods. A City's Green-Score can be the average of data pixels within an 8 km (5 mi) radius, and also may not be measured by legal or demographic boundaries of cities. The official city boundary (polygon) can be used as the area being measured for our actual city scores, and county and census tract scoring.

As another example, the area of polygons that define anything considered to be a green or outdoors space (whatever is deemed usable for the scoring) can be analyzed, and the portion of those polygons' areas that are within a radius can be measured/aggregated to arrive at a GreenScore for that location. This can be based on OpenStreetMap's data (which defines the region of parks and similar), and the intersection of those polygons within a circular area around a property/address/lat-long, etc. can be used. Computer vision (as opposed to satellite images) and Google Street View and various image databases (like the Normalized Difference Vegetation Index (NDVI) from the National Agriculture Imagery Program (NAIP)) and the -Normalized Difference Water Index (NDWI) can also be employed. These location specific metrics derived using databases or determined in real-time, are referred to herein more generally as "classification values" or "CVs".

Figure 2A:
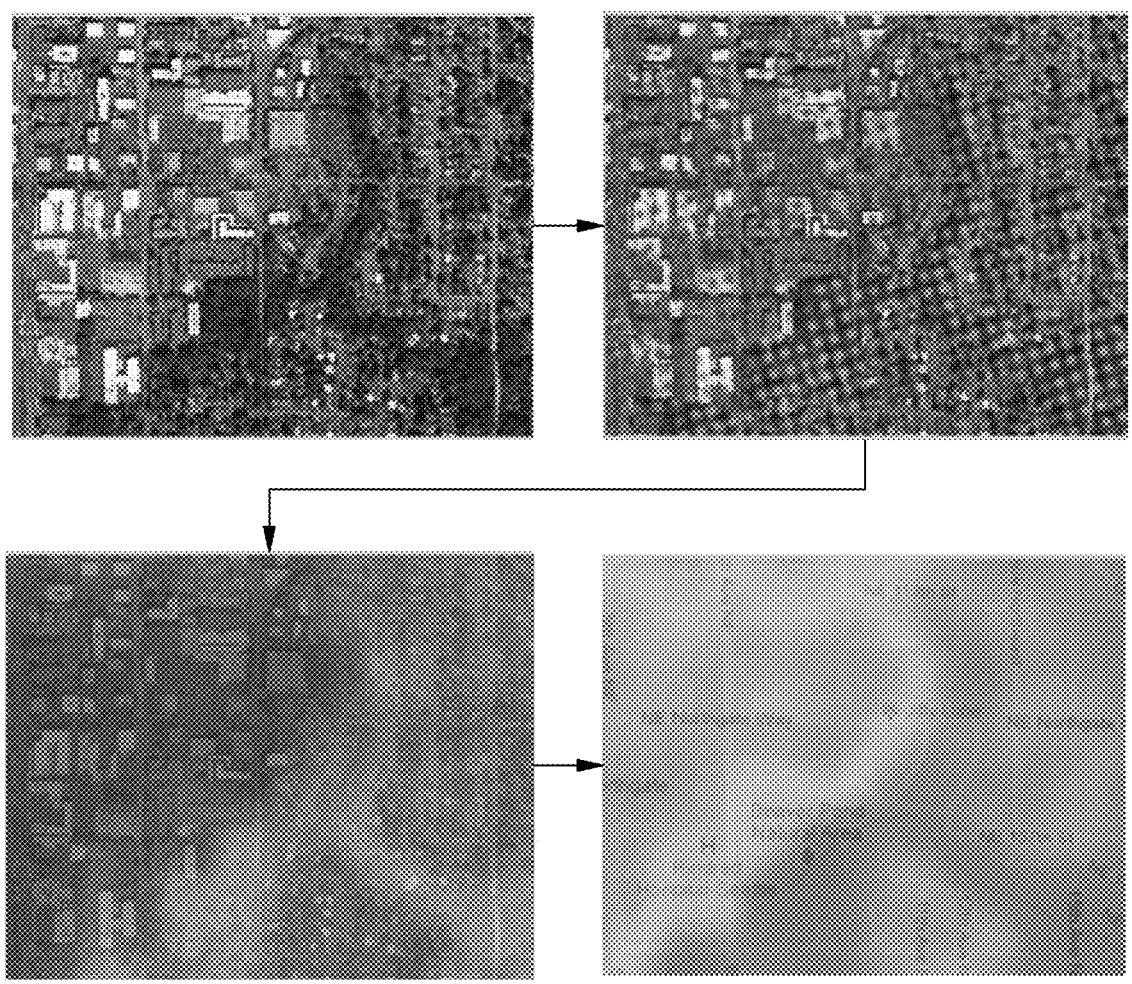
FIGS. 2a-b depict example data used in characterizing localized natural areas in accordance with an aspect of the present invention.
Figure 2B:
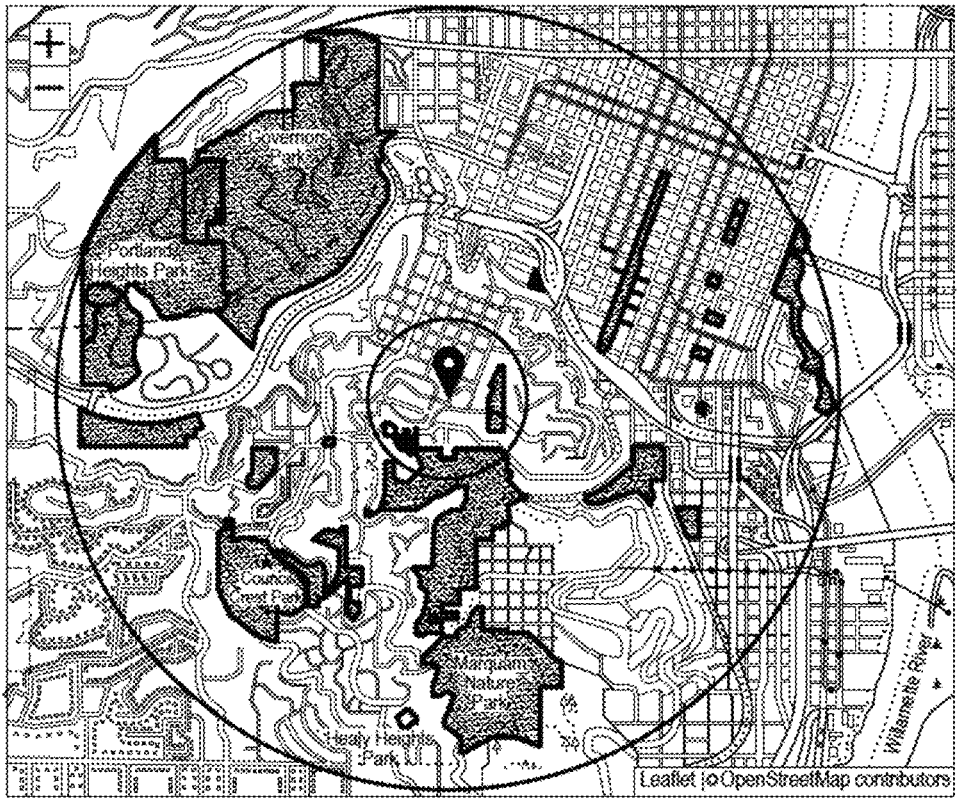

FIGS. 2a-b show generally the types of input data that can be used to assess the quantity, quality and/or type of information that can be used to obtain a GreenScore. FIG. 2b shows an exemplary map input to a GreenScore calculation for a particular location—1626 SW Elizabeth St, Portland OR A GreenScore of 52 is obtained around this location, using the map's natural areas, including various parks. As another example, a GreenScore within a range of 0-100 can be determined as follows:

maximum of ((2*% of area within 400 meters of location that is natural)+(% of area within 2000 meters of location that is natural)) and 100.

As another example the score can be determined as follows:

(W1*CV1)+(W2*CV2)+(W3*number of nature areas within xx km) where "W" connotes a weighting, related to its respective CV, or any other chosen metric).

More generally, multiple land classification values (CVs), combined with respective weightings can be used to produce a composite numeric score.

In a further example, a bucketing/simplification of the composite scores into 5 "buckets" can be output, having an approximately even distribution across the buckets. Initially, a "Normalized Distribution" can be used to spread the raw scoring between 0-100 in roughly equal distributions. The "Normalized Distribution" returns the probability of getting less than or equal to a particular value in a normal distribution. The Normalized Distribution scores are between 0 and 1. This percentage ranking result is multiplied by 100 to return a final score i.e., the "GreenScore" or "NatureScore" in a potential commercial embodiment. This final score can be then simplified into 1 of 5 buckets (1-20, 21-40, 41-60, 61-80, 81-100) for ease of presentation, e.g., a "leaf score" having 1-5 leaves.

The GreenScore'GreenScore can be used as a static measurement of nature areas; and can also be used as an input to an individual's NatureDose dynamically, relative to the time they spend outside at any given location—discussed further below.

Naturedose Examples

Figure 3:
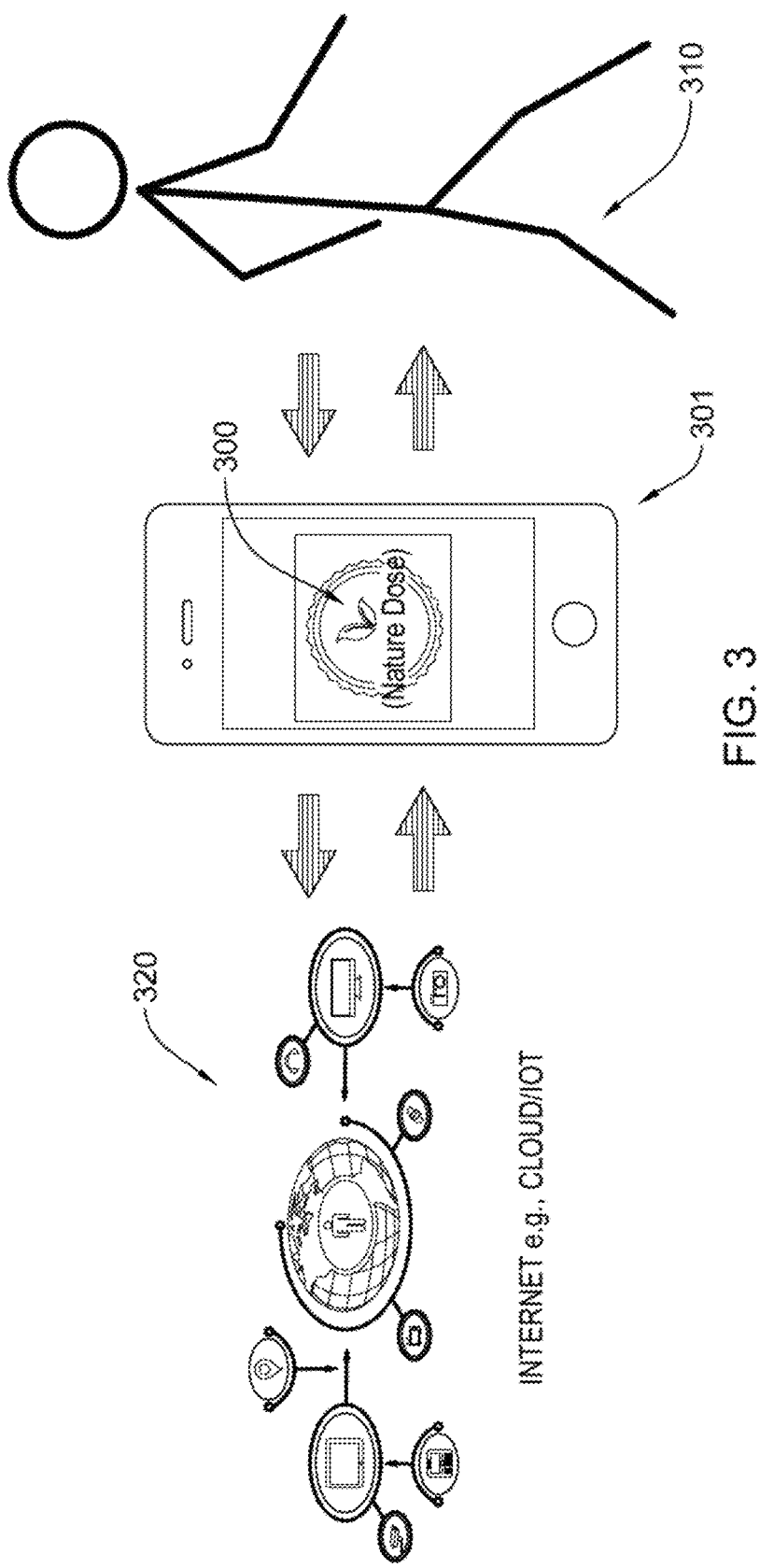
FIG. 3 depicts a mobile phone application in accordance with an aspect of the present invention.

FIG. 3 depicts an exemplary system and method in the form of application 300, in accordance with one aspect of the present invention, operating primarily on a computing device (e.g., mobile phone) 301, for determining a nature dose in accordance with the principles of the present invention. Application 300 and/or device 301 may communicate with and/or cooperate with both a user 310, and internet (e.g., cloud/IOT) resources 320, to effect the principles of the present invention.

Figure 4:
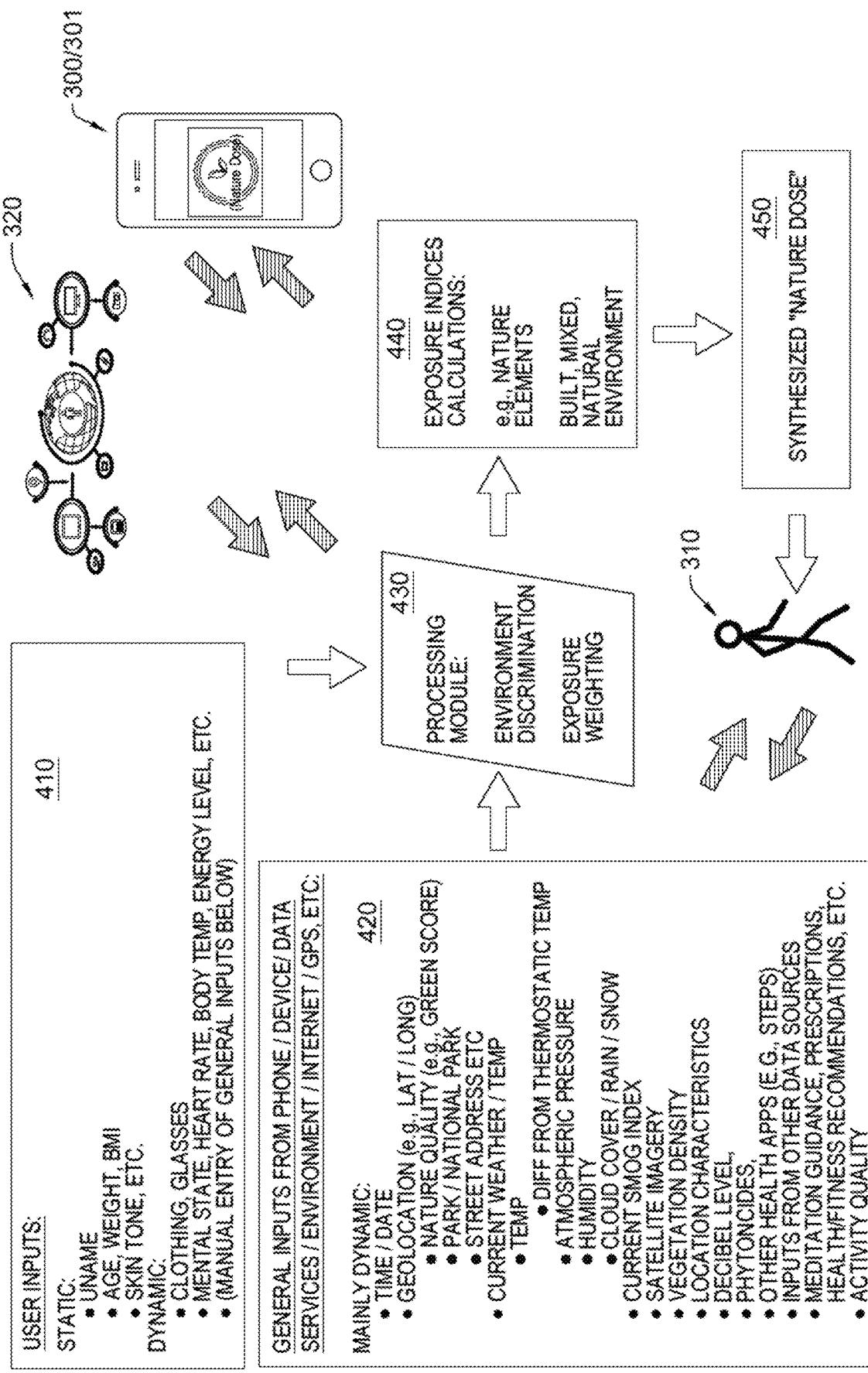
FIG. 4 depicts an exemplary data flow diagram in accordance with an aspect of the present invention.

FIG. 4 depicts an exemplary static and dynamic data flow diagram 400 for application 300 in accordance with one aspect of the present invention. Certain user inputs 410 can be obtained, both static and dynamic. For example, static inputs (stored and/or obtained from a user) may include username, age, weight, BMI, skin tone, etc. Dynamic inputs may include clothing, glasses, mental state, heart rate, body temp, energy level, etc., and as applicable, manual entry of general inputs below. These user inputs may be sampled at appropriate intervals based upon how likely they are to change, and/or at user selected intervals, or at trip start/restart, etc.

Certain general inputs 420 can be obtained from phone/device/data services/environment/internet/GPS, etc, and are mainly dynamic, including: Time/Date; Geolocation (e.g., Lat/Long) including: Nature quality—e.g., the GreenScore discussed herein, nearby Park/National Park, Street Address, etc; Current weather/temp including: Temp, Difference from thermostatic temp, Atmospheric pressure, Humidity, Cloud cover/rain/snow; Current smog index; AQI (Air Quality Index) e.g., air particulates/pollutants; Satellite imagery; Vegetation density and type; Location characteristics; Decibel level; Phytoncides; Other health apps (e.g., steps); inputs from other data sources; and Meditation guidance, prescriptions, health/fitness recommendations, etc.). These dynamic inputs may be sampled at appropriate intervals (seconds, minutes, hours) depending on how likely they are to change, and/or at user selected intervals. Additional quantitative or qualitative data such as activity quality (e.g., speed of walking/running, difficulty of terrain, challenge/danger levels, etc.) can be collected as user and/or general inputs and factored in to the calculation.

Any or all of these exemplary User (410) and General (420) inputs can then be provided to processing module 430 to determine environment discrimination (insider versus outside) and apply appropriate exposure weightings. Exposure Index Calculations 440 are then performed based on e.g., the nature elements being encountered and the built/mixed/natural environment encountered (e.g., based on the GreenScore of the location encountered), resulting in a synthesized NatureDose 450 provided to user 310. The NatureDose can be synthesized as an aggregate dose over user-selected period(s) of time (e.g., seconds, minutes, hours, trips, days, weeks, months, etc.) and stored as such for further reference.

Any of the data input modules 410 and 420, and functional processing/calculation modules 430, 440, 450, may be implemented on, communicate with, and/or cooperate with application 300 (e.g., on device 301), and internet (e.g., cloud/IOT) resources 320, and with user 310, to effect the principles of the present invention.

Figure 5:
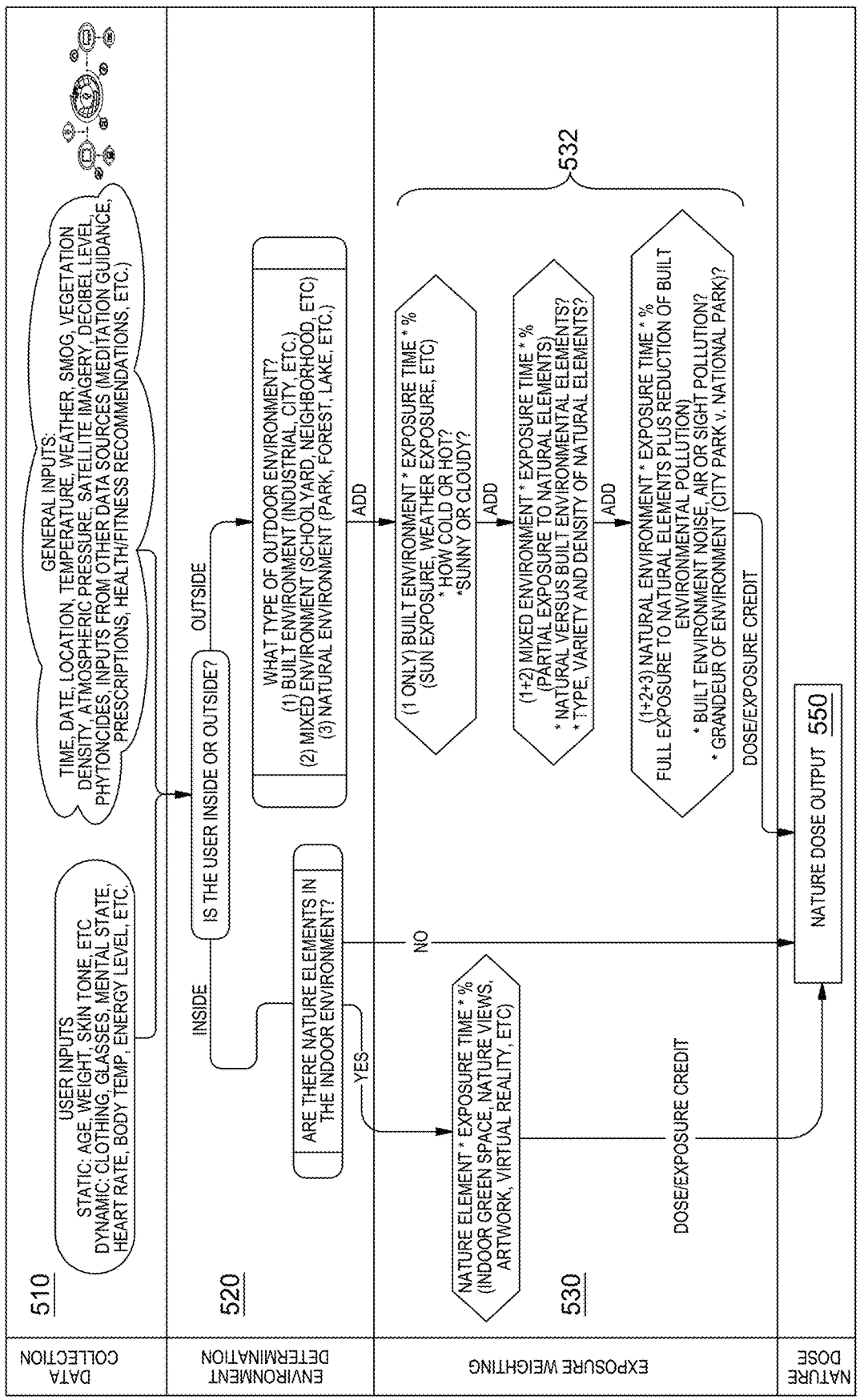
FIG. 5 depicts an exemplary process flow-chart in accordance with an aspect of the present invention.

FIG. 5 depicts an exemplary process flow 500 for application 300 in accordance with one aspect of the present invention. Data collection 510 is executed, for the User and General inputs discussed generally above with respect to FIG. 4. Environment Discrimination 520 (is user inside/outside) is executed, leading to two (2) separate processing paths in Exposure Weighting 530—including credits for any natural elements inside; and a series of weighted calculations 532 for outside exposure based on (1) Built (2) Mixed and/or (3) Natural Environment, each calculation of which can add a "credit" to the resultant NatureDose 550. As mentioned above, the NatureDose can be synthesized as an aggregate dose over user-selected period(s) of time (e.g., seconds, minutes, hours, trips, days, weeks, months, etc.) and stored as such for further reference.

As one example of determining a NatureDose:

NATUREDOSE=Location GREENSCORE*Elapsed Time for Given Location where: *Location GREENSCORE=Determination of Environment and density/type of natural elements. (For example a concrete parking lot would be near zero and a forest would be near 100.)

APPLICATIONS

There are many promising applications for enhanced conformity in and access to quantified nature exposure. The invention could be used as a stand-alone product or as an added feature for existing applications and practices.

Healthcare: While many health practitioners are already prescribing "time in nature," tracking that nature exposure is limited to efforts like counting park visits. As previously noted, numerous studies have shown that simply living near nature improves health outcomes. Additionally, insurance companies are promoting time in nature but are not monitoring members' exposure or providing incentives related to such exposure (like existing 10,000-step incentives). The present invention will enable real-time monitoring of nature exposure; it will also determine the amount of nature near a residence. Health care providers and insurance companies can leverage and analyze nature's positive effects on health and reduce overall health expenses.

Government: Governments will be able to use the present invention for city planning, public health initiatives, tax assessment, and natural resource tracking/quantification.

Real Estate: The present invention will identify and assess the natural elements around any given real estate parcel for valuation and comparison purposes. Living in greener urban areas is associated with lower probabilities of cardiovascular disease, obesity, diabetes, asthma hospitalization, mental distress, and ultimately mortality among adults, and with lower risks of obesity and myopia in children. Nature-rich neighborhoods are also associated with better self-reported health and subjective well-being in adults, and with improved birth outcomes and cognitive development in children. Nature spaces may also reduce the transmission rate of contagious diseases. Specifically, a recent meta-study involving eight-million people and seven countries found that for every 10% increase in vegetation within 1,600 feet of one's home, the probability of death drops by 4%. As these results shape the public mindset, natural areas will increasingly affect real estate value.

Furthermore, trees and other vegetation around a home add not only aesthetic appeal but also can provide shade during the summer and wind protection in the winter. And they can offer visual privacy and mitigate sound. Beyond the health benefits, all these additional factors translate into increased property values. By way of example, a study in Toronto, Canada concluded that living in a home with ten or more trees in a city block, on average, improves health perception as much as earning $10,000 more per year or being seven years younger. Proprietary research using the present invention and home sales in 2019 has shown up to 50% increases in property values for some regions when comparing the upper and lower quintile of scores. This correlation between property value and GreenScore could be used to assess real estate portfolios, mortgage-backed securities, lender risks, and tax assessor projections. Furthermore, for those seeking a healthy environment for their family, the GreenScore tool can provide unique data and screening abilities.

The present invention can be a basic component of any real estate assessment.

Business: The present invention's ability to track an individual's nature exposure will complement many other physical health, mental health, and fitness apps, like activity trackers, meditation apps, psychiatry apps, and therapy apps. The present invention will also enable corporations seeking to broadly enhance worker health and productivity through nature.

Direct to Consumer: A user's ability to monitor her own time in nature will be helpful for personal fitness and medical goal setting and monitoring as well as the "gamification" of time outside. The applications will also provide educational and motivational features, for example via "daily tips" and "scoring/ranking systems." Other elements, like maps/guidance to nearby natural areas, UV-exposure tracking, and vegetation guides, could be included. Note that, based on numerous studies, 120 minutes per week is a recommended minimum dose, with positive associations peaking at 200-300 minutes per week of nature exposure.

Research: The present invention will be able to determine the most impactful components of nature exposure through more robust and consistent data collection. The invention's AI-driven techniques may allow for more standardized protocols and methods for the evaluation of the impact of green-bluespace on health. The present invention will thus enhance the already widespread use of spatial data in greenspace/bluespace and health-related studies, offering valuable data to both scholars and urban planners regarding the impact of urban design on health and wellbeing.

Financial Analysis: Given the strong associations the present invention has shown with longevity and real estate prices, financial analysts could use it to improve their forecasting models. For example, total pension plan or annuity liability projections could be improved based on an understanding of the amount of nature near members' homes. In a similar fashion, life or health insurance premiums could be adjusted. Real estate portfolios or mortgage-backed securities could also be analyzed based on the current or anticipated proximity to nature.

Humanity's shift to an indoor life spent predominately in cities is dramatic. The sudden loss of interaction with nature is affecting our physiology and psychology in ways that we are just starting to comprehend. Given the burgeoning recognition of the value of exposure to nature, the present invention seeks to further the development of strategies and interventions for the use of natural spaces through innovative technology. The present invention should encourage practitioners, policymakers, businesses, and individuals to consider how they can create, maintain, use, promote, and improve access to nature.

Finally, in reference to current events, COVID-19 is too new to allow extensive information on associations between nature exposure and severity of the disease or mortality, however strong associations have been reported between chronic respiratory disease, inflammation, and severity of symptoms and death rates from COVID-19. One study from the Harvard T. H. Chan School of Public Health found that an increase of only 1 µg/m3 in air pollution is associated with an 8% increase in the COVID-19 death rate. This suggests that someone who lives in an area with high levels of fine particulate pollution is significantly more likely to die from COVID-19 than someone who lives in a region with just one unit of pollution less. Additional recent data from China has determined that nearly every known infection (over 99.99%) initiated from contact in an indoor environment. Similarly, there is evidence that adequate Vitamin D levels are necessary for an effective vaccination response. Sunlight is an essential aspect of Vitamin D synthesis within the body, and having nature close and available helps to encourage sun exposure. Studies will likely demonstrate that those living with less access to natural environments are at heightened risk for exposure and severe symptoms or death from COVID-19.

As understood by one skilled in the art from the description provided, a computer system, computer-implemented method, and computer program product are disclosed herein for quantifying and characterizing natural areas at, or near, a designated location or geographical area, as well as using the information about the location and character of a user's activities in providing a user with a dynamic output representative of the user's nature dose in order to facilitate an action, such as for instance, a user achieving a desired quantity and/or quality of exposure to natural areas.

Embodiments of the present invention include a computer-implemented method, a system, and a computer program product, where program code executing on one or more processors obtains environmental-related data for a geographic area from one or more data sources, and performs data analysis on the environmental-related data, including automatically manipulating, based on the data analysis, the environmental-related data to obtain characterized environmental-related data which facilitates generating a nature-related score for the geographic area. Embodiments of the present invention further include program code to use the characterized environmental-related data in automatically generated a nature-related score for the geographic area, and in providing the nature-related score for the geographic area to facilitate performance of an action based on the nature-related score.

In certain embodiments, program code executing on one or more processors obtains user-related data for a user, and based on the nature-related score for the geographic area and the user-related data, provides a nature-related recommendation specific to the user, where the action is a user-action based on the nature-related recommendation.

In one or more embodiments, the user-related data includes time data representative of time spent by the user at the geographic area, and program code is provided to generate a nature dose value for the user using the nature-related score for the geographic area and the time data, where the nature-related recommendation specific to the user is based, at least in part, on the generated nature dose value for the user.

In one or more embodiments of the present invention, providing the nature-related recommendation specific to the user includes using machine learning in generating the nature-related recommendation specific to the user based, at least in part, on the nature-related score and the user-related data. In one embodiment, the user-related data is received, at least in part, from one or more devices of the user which obtain user biological data, and the nature-related recommendation specific to the user is based, at least in part, on the user biological data.

In certain embodiments, program code executing on one or more processors receives a reference data set, and automatically generates the nature-related score for the geographic area includes correlating, via data analysis, the nature-related score and the reference data set. In one embodiment, the correlating includes using machine learning in tying the nature-related score to the reference data set. In a further embodiment, the reference data set includes at least one of a health data set, a real estate data set, an economic-related data set, or a temperature data set.

In one or more embodiments of the present invention, obtaining environmental-related data for the geographical area includes obtaining environmental-related data for the geographic area from a plurality of data sources, and manipulating the environmental-related data includes merging the environmental-related data from the plurality of data sources in obtaining the characterized environmental-related data that facilitates generating the nature-related score for the geographic area.

In one or more embodiments, the environmental-related data from the plurality of data sources includes two or more environmental-related data of: Normalized Difference Vegetation Index (NDVI) data, Normalized Difference Water Index (NDWI) data, National Land Classification Data, satellite image data, nature quality data, nature type data, vegetation density data, vegetation type data, geographic characteristic data, precipitation-related data, and climate-related data.

In one or more implementations of the present invention, the characterized environmental-related data for the geographic area is dependent on time of year, and program code executing on one or more processors provides the nature-related score for the geographic area for a particular type of year to facilitate performance of the action based on the nature-related score.

Embodiments of the present invention are inextricably tied to computing and advantageously constitute an unconventional and unique combination of elements that solve a practical problem. For instance, embodiments of the present invention provide code executing on one or more processors that utilize various computing-centric data analysis and handling techniques, in order to provide a nature-related score for a geographic area to facilitate performance of an action based on the nature-related score. The nature-related score (provided to facilitate performance of an action based on the nature-related score) can be utilized in a variety of applications as described herein, including in characterizing a user's activities by providing the user with a dynamic output representative of the user's nature dose, which can facilitate an action, such as for instance, a user achieving a desired quantity and/or quality of exposure to natural areas.

As described herein, in embodiments of the present invention, program code provides significantly more functionality, including but not limited to: 1) program code that obtains environmental-related data for a geographic area from one or more data sources; 2) program code that performs data analysis on the environmental-related data and automatically manipulates, based on the data analysis, the environmental-related data to obtain characterized environmental-related data which facilitates generating a nature-related score for the geographic area; 3) program code that uses the characterized environmental-related data in automatically generating a nature-related score for the geographic area; and 4) program code that provides the nature-related score for the geographic area to facilitate performance of an action based on the nature-related score.

Figure 6:
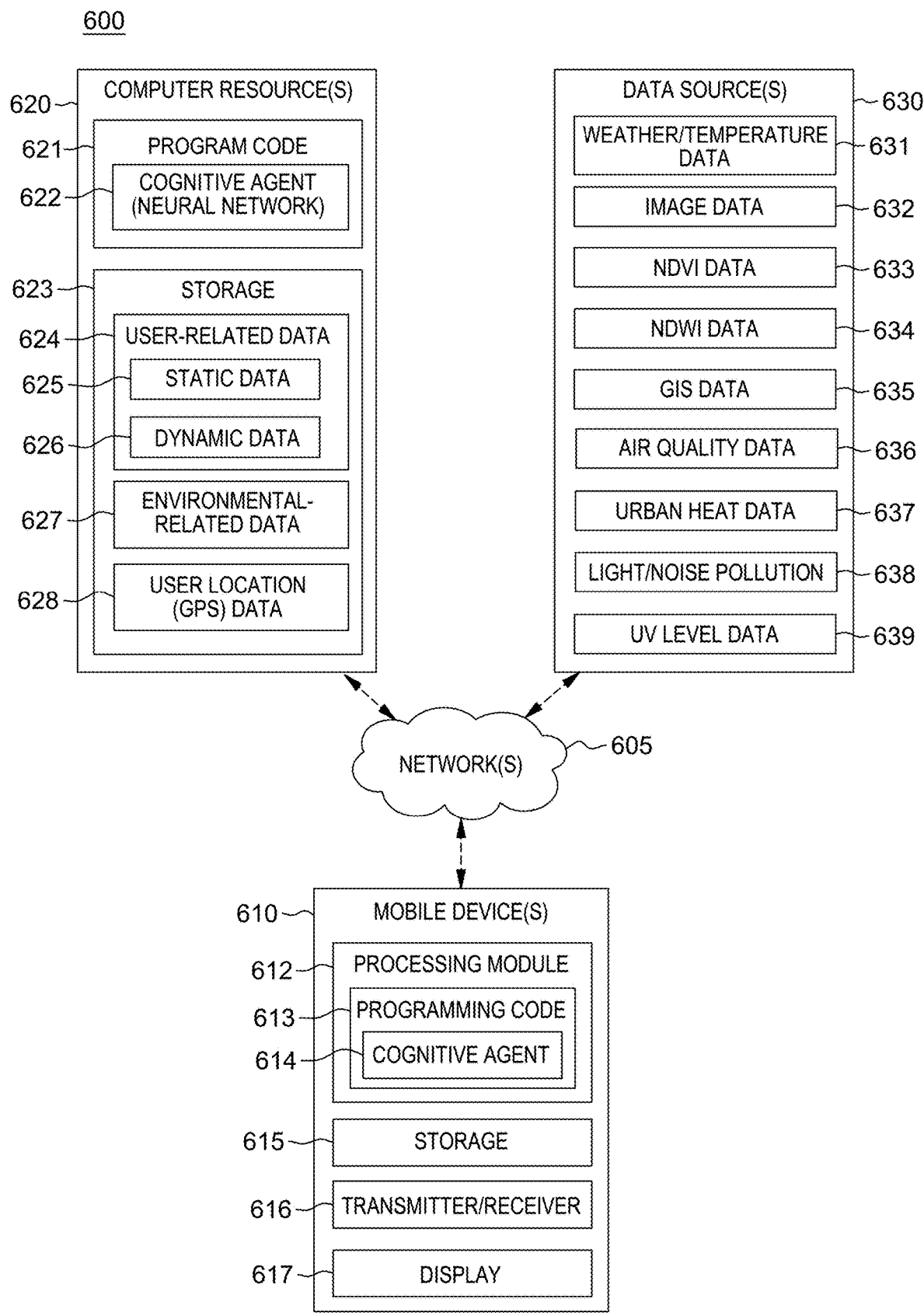
FIG. 6 depicts one embodiment of a technological environment or system in which one or more aspects of the present invention can be implemented.

By way of further example, FIG. 6 depicts one embodiment of a technological environment or system in which one or more illustrative embodiments described herein can be implemented. FIG. 6 is only an example, and is not intended to imply any limitation with regard to the technological environment in which embodiments can be implemented. A particular implementation can have any number of modifications to the depicted environment.

As depicted in FIG. 6, system 600 includes, for instance, one or more mobile devices 610, such as one or more mobile electronic devices associated with a user. In one or more embodiments, mobile device(s) 610 can have a wireless communication capability, and can be, for instance, a smartphone, a personal digital assistant (PDA), a wireless computer, a tablet, a personal communication system, a vehicle-monitored system, a wearable device, smartwatch, etc., capable of obtaining data, performing processing and/or providing data, such as described herein.

As illustrated, mobile device 610 can include a processing module 612 with program code 613 including, in one or more embodiments, a cognitive agent 614. Further, mobile device 610 can include storage 615, for storing electronic data, as well as a transmitter/receiver 616, and a display interface 617.

In one or more embodiments, program code 613 includes program instructions which implement one or more aspects of processing described herein, and can include a cognitive agent, or learning agent, which can update and/or use one or more models to provide recommendations to a system user in order to, for instance, achieve a desired goal of the user related to, or effected by, nature. In practice, a variety of machine learning training data sets can be employed by the cognitive agent to perform cognitive analysis of various inputs, such as the environmental-related data and user-related data described herein.

In one or more embodiments, program code 613 performs cognitive analysis to generate data structures, including processes used by the program code to generate and provide a nature-related score to facilitate performance of an action based on the nature-related score, and/or a nature-related recommendation specific to a user, where the action is a user-action based on the nature-related recommendation. Machine learning (ML) solves problems that cannot be solved by numerical means alone. In an ML-based implementation, program code extracts various features/attributes from training data (e.g., data collected from various data sources relevant to the environmental-related data and/or user-related data), which can be resident in one or more databases. The features are utilized to develop a predictor function, also referred to as a hypothesis, which the program code utilizes as a machine learning model. In identifying a nature-related score, a nature-dose value and/or a nature-related recommendation, the program code can utilize various techniques to select features (elements, patterns, attributes, etc.) including, but not limited to, diffusion mapping, principle component analysis, recursive feature elimination (a brute force approach to selecting feature), and/or a random forest, to select, for instance, the attributes related to various nature elements and effects thereof on a user. The program code can utilize a machine learning process to train the machine learning model (e.g., the processes utilized by the program code), including providing rankings or weightings for extracted data or conclusions, so that the program code can train the predictor or recommendation functions to include the machine learning model. The conclusions can be evaluated by a quality metric. By selecting an appropriate set of training data, the program code trains the machine learning model to identify and weight various attributes (e.g., features, patterns) that correlate (for example) environmental-related data and one or more goals or reference data sets, as well as user-related feedback data, and to provide based thereon one or more recommendations, such as one or more nature-related recommendations, to facilitate performance of an action based on the nature-related score.

In one or more embodiments of the present invention, program code 613 on mobile device 610 can determine, either proactively or reactively, a customized nature-related recommendation for the user. Any of a number of cognitive agents commercially available can be used to facilitate this processing. In one or more embodiments, program code 613 interfaces with one or more cognitive agents 614 to perform a cognitive analysis of obtained data, such as described herein. For instance, in some embodiments of the present invention, certain Application Programming Interfaces (APIs) of the cognitive agent can include one or more programs, including, but not limited to, natural language classifiers, Retrieve and Rank, concepts/visual insights, tradeoff analytics, document conversion, and/or relationship extraction. In an embodiment of the present invention, one or more programs are provided to analyze the environmental-related data obtained by the program code across various sources utilizing, for instance, one or more of a natural language classifier, Retrieve and Rank API, tradeoff analytics API, etc. The program code 613 can provide predictions or recommendations as described herein. In some embodiments of the present invention, program code 613 can provide a specific nature dose value and/or recommendation to an individual, or a nature-related recommendation to the individual.

In some embodiments of the present invention, program code 613 can utilize a neural network to analyze collected data relative to a system user to generate the one or more models used in generating a nature dose value or nature-related recommendation. Neural networks are a programming paradigm which enable a computer to learn from observational data, such as sensor data, goals, environmental data, body of knowledge, etc. This learning is referred to as deep learning, which is a set of techniques for learning in neural networks. Neural networks, including modular neural networks, are capable of pattern (e.g., state) recognition with speed, accuracy, and efficiency, in situations where data sets are multiple and expansive, including across a distributed network, such as, but not limited to, cloud computing systems. Modern neural networks are non-linear statistical data modeling tools. They are usually used to model complex relationship between inputs and outputs or to identify patterns (e.g., states) in data (i.e., neural networks are non-linear statistical data modeling or decision-making tools). In general, program code 613 utilizing neural networks can model complex relationships between inputs and outputs and identify patterns in data. Because of the speed and efficiency of neural networks, especially when parsing multiple complex data sets, neural networks and deep learning provide solutions to many problems in multiple-source processing, which program code 613 in embodiments of the present invention can use when obtaining data and building a model for providing, for instance, a GreenScore, Nature-Dose, and/or nature-related recommendations for performance of an action.

As illustrated, in the embodiment of FIG. 6, one or more networks 605 operatively couple mobile device(s) 610 to one or more computer resources 620 and/or to data sources 630. By way of example only, network(s) 605 can be, or include, one or more wired and/or wireless networks capable of receiving and transmitting data, such as data described herein, including one or more user-specific recommendations.

As illustrated, computer resource(s) 620 can be separate from mobile device(s) 610 and be operatively coupled therewith across network(s) 605. In one specific embodiment, computer resource(s) 620 can be one or more cloud-based computing resources. As illustrated, computer resource(s) 620 can include program code 621, as well as one or more cognitive agents 622, which can implement processing such as described herein in association with program code 613 and cognitive agent 614. In one implementation, system processing can be distributed, with a portion of the processing being provided by mobile device(s) 610, and another portion by computer resource(s) 620. In other embodiments, various aspects of the processing described herein can be implemented principally on remote computer resource(s) 620, if desired. Further, computer resource(s) 620 can include storage 623 for storing data, such as user-related data 624, environmental-related data 627, user-device geolocation (GPS) data 628, as well as other data, depending on the implementation. User-related data 624 can include static data 625 such as described herein (e.g., age, weight, BMI, skin tone, etc.), and/or dynamic data 626 for the user (e.g., data representative of the user's clothing, glasses, mental state, heartrate, body temperature, energy level, etc., at a given time).

As noted, one or more data sources 630 can be accessed by computer resource(s) 620 and/or by mobile device(s) 610, and can provide, for instance, weather/temperature data 631, image data (such as aerial image data) 632, NDVI value data 633, NDWI data 634, GIS data 635, air quality data 636, urban heat data 637, light/noise pollution data 638, UV level data 639, and/or other data relating to a geographic area or location. Data obtained from data source(s) 630 can be used by program code 621 and/or program code 613 to establish, for instance, environmental-related data 627 for, or about, a designated geographic area, which can then be used to determine a GreenScore or NatureScore for the designated geographic area, as described herein.

In one or more embodiments, system 600 tracks a user's location by monitoring, for instance, user-device geolocation data 628 in real time. Based on identifying a location of the user's mobile device(s) 610, environmental-related data structure 627 can be documented and/or generated for the designated geographic area using data from data source(s) 630 for the duration of time at which the user's mobile device(s) 610 is located within or at the designated geographic area.

Alternatively, in one or more embodiments, a user can indicate via a user interface, such as via display 616 of mobile device 610, that the user was previously located at a designated geographic area for a given duration of time on a given date. With this information, program code 621 and/or program code 613 can generate a environmental-related data 627 for the designated geographic area for the given duration of time on the given date, using data obtained from data source(s) 630. The generated geographic-related data 627 can then be used to determine the user's NatureDose for the given duration of time on the given date based on the user's exposure (e.g., quantity, quality, nature type) to nature. In one or more other embodiments, determination of the NatureDose could be predictive in that the user could input to the system via a user interface, such as via mobile device 610, that the user plans to be at a designated geographic area for a given duration of time on a given date.

Further, the program code can use environmental-related data 627 to generate and provide one or more recommendations, for instance, via the user's mobile device 610, indicative of a GreenScore of the geographic area and/or the user's specific NatureDose experienced or anticipated to be experienced over a designated period of time.

In one or more embodiments, program code is configured or programmed to build or generate environmental-related data that maps various data inputs associated with a geographic area, such as landcover types, vegetation densities, vegetation seasonality, built city elements identified in image data, etc., to one or more associated attributes that influence the location's GreenScore. The building of the environmental-related data can be based on a body of domain knowledge obtained via a plurality of data sources, and can include cognitively analyzing, via machine learning, the body of domain knowledge obtained from the plurality of sources to establish relationships between the data located from the plurality of sources and one or more selected attributes that influence the location's GreenScore.

In one or more embodiments, program code 621 and/or program code 613 can provide the environmental-related data 627 to the cognitive agent, or learning agent. Based on this input, the cognitive agent can use machine learning to predict, if desired, a GreenScore and/or NatureDose for a designated geographic area based on the knowledge learned from the obtained data. Further, the determined, or predicted, GreenScore and/or NatureDose can be used to provide one or more recommendations, via the user's mobile device, which can enable the user to prepare and/or modify plans in order to achieve, for instance, a desired goal.

Figure 7:
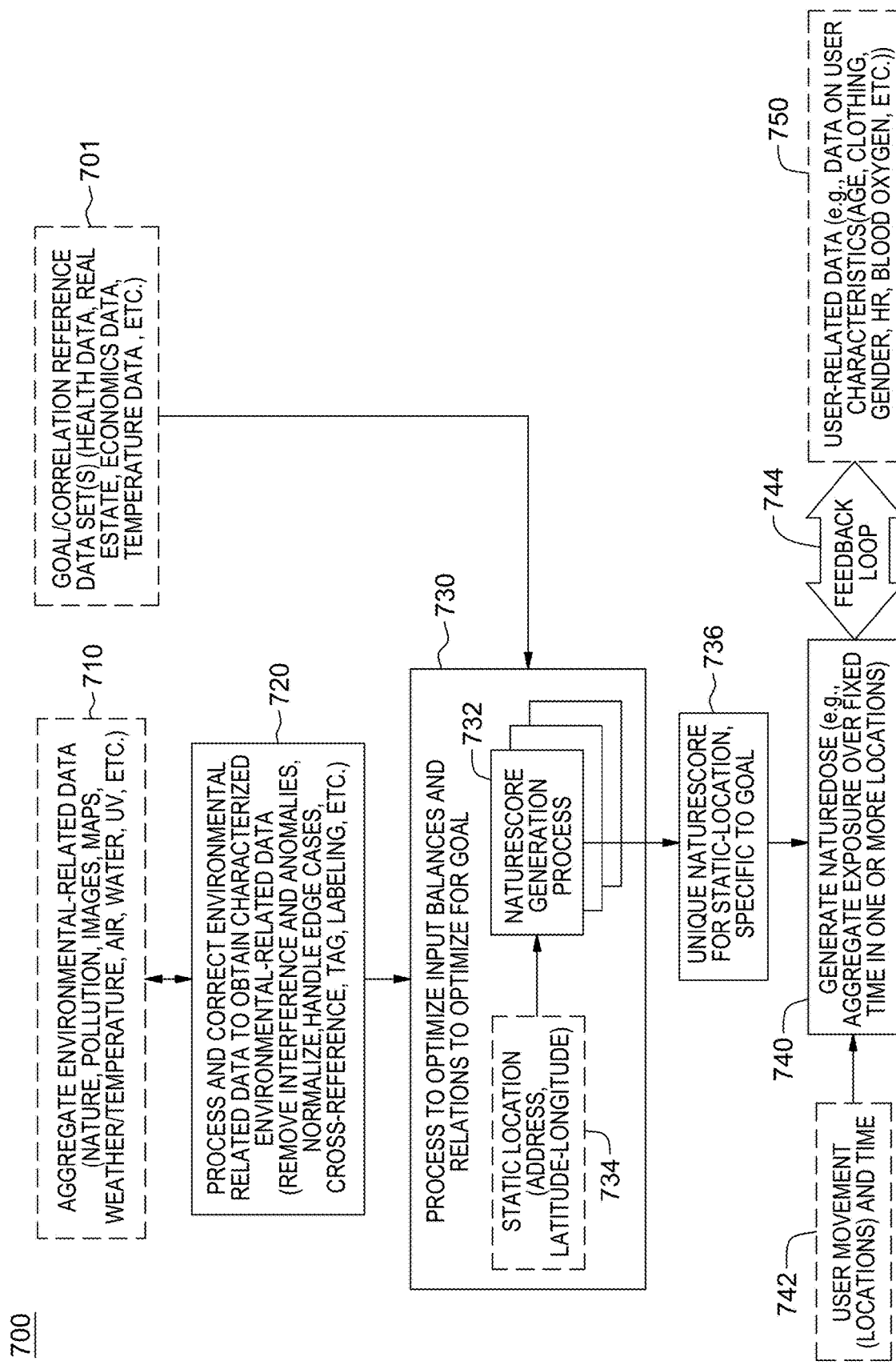
FIG. 7 is another embodiment of a process, in accordance with one or more aspects of the present invention.

By way of further example, FIG. 7 depicts another embodiment of system processing (or program code) of a computer system, computer-implemented method, or a computer program product, in accordance with one or more aspects disclosed herein. In one embodiment, processing 700 relates to determining the type, quality, and quantity of natural areas at, or proximate to, a given location or geographic area, and dynamically monitoring and interpreting a system user's exposure to natural areas and/or elements. As detailed herein, the processing yields valuable data for a given location, and from the system user's movements, or anticipated movements, can generate an amount of nature exposure, which can also be used by a system cognitive agent and/or adviser model, to provide one or more user-specific, nature-related recommendations.

As illustrated in FIG. 7, process 700 includes, in one embodiment, aggregating numerous data sets to allow for remote interpretations of natural areas and/or elements of an environment or geographic area under examination 710. The process can use an evolving combination of data inputs ranging from environmental-related data regarding the immediate surroundings (10-100 meter buffer), to neighborhood-scale environmental-related data (up to 1000 meter buffer), to regional-scale data (1000+ meter). The various environmental-related data inputs can be manipulated by: tagging, characterizing, merging and/or cross-referencing the data to provide characterized geographic-related or environmental-related data that facilitates a meaningful understanding of the amount and quality of natural elements in the geographic area. The data sets can include, for instance, data on landcover types, vegetation densities, vegetation seasonality, built city elements, and general street map and related data. This data can be collected from various data input sources including, for instance, aerial imaging, Normalized Difference Vegetation Index (NDVI) values, which is a simple graphical indicator from a space platform used to assess whether the observed location or area contains live green vegetation, various GIS databases and open street map databases, and various image data analysis tools allowing review of, for instance, Google® street images and street-level data views. Additionally, the aggregate environmental-related data process 710 can incorporate or use data representative of built environmental pollutants, such as air quality data, noise pollution data, and light pollution data, which are available in a variety of separate data sets. Other data, such as data on NDVI, NDWI, National Land Classification Databases, tree canopy, OSM, park service, AQI, aerial image data, Google® street view data, scenic view quality data, etc., can also be used in process 700.

As illustrated in FIG. 7, process 700 further includes program code processing or manipulating the aggregated environmental data, including, for instance, correcting any raw environmental data to remove interference and anomalies, normalizing the data, handling edge cases, cross-referencing, tagging and/or labeling, etc., the data 720. In one or more implementations, process 720 can includes manipulating the aggregated environmental-related data by, for instance, removing cloud interference, cross-referencing to determine low NDVI, natural elements versus built elements, as well as tagging and labeling elements via computer image analysis and artificial intelligence, and categorizing the elements identified within the geographic area.

More particularly, process 720 can include program code to tag, categorize and correct any interference once the environmental-related data is collected. For aerial image data or satellite measurements, cloud interference can be removed. Artificial turf and natural grass can be delineated. For GIS databases or land classification databases, natural element categories can be identified and categorized. Further, the NDVI average values can be corrected. NDVI is a form of phenology, which studies data gathered by satellite sensors that measure wavelengths of light absorbed and reflected by green plants. Certain pigments in plant leaves leave strong absorption wavelengths of visible (red) light. Many sensors carried aboard satellites measure red and near infrared light waves reflected by land surfaces. This raw satellite data can be transformed about these light waves into vegetation indices. A vegetation index is an indicator that describes the greenness, that is, the relative density and health of vegetation, for each picture element, or pixel, in a satellite image. Although there are several vegetation indices, one of the most widely used is the Normalized Difference Vegetation Index (NDVI). NDVI values range from +1.0 to −1.0. Areas of barren rock, sand or snow usually show very low NDVI values (for example, 0.1 or less). Sparse vegetation, such as shrubs and grasslands or crops, can result in moderate NDVI values (approximately 0.2 to 0.5). High NDVI values (approximately 0.6 to 0.9) correspond to dense vegetation such as that found in temperate and tropical forests or crops at their peak-growth stage. NDVI scores for water generally have negative values. Depending on the quality of the satellite data, the pixel data corresponds to approximately 10-30 meters of surface area on the Earth. To measure the volume or health of vegetation in a larger area, an average of the aggregated pixel data can be used.

One issue with the system determining the volume of natural versus built elements for a large area using NDVI averaging, is that many natural elements (such as water or rock or sand) can offset abundant adjacent live vegetation. For example, looking at a 100 sq. meter circle that is half jungle and half water, would look identical to a score for a parking lot (since the negative water score and positive jungle score average out to zero). The processing disclosed herein can use a cross-referencing approach or system that combines NDVI averaging with other land classification data sets and remote sensing technologies to allow for an accurate measurement of the density and/or volume of live vegetation, and the balance between built and natural elements to facilitate determining a GreenScore or NatureScore for a specified geographical area. With this process, a determination of what percentage of an area is natural versus built elements can be made, and among the natural elements, how much of the natural elements are live, healthy vegetation can be obtained and saved as the environmental-related, or geographic-related, data.

In one or more embodiments, process 700 also includes a process to optimize the data input balances and relationships to optimize the quantified nature data, such as based on or for a user's inputted goal(s) 730. As illustrated, the system can utilize one or more goals and/or correlated reference data for a specific user of the system. For instance, health data, real estate data, economic data, temperature data, etc., can all be used as input in relation to determining the GreenScore and/or NatureDose being determined by process 730. In one implementation, process 730 is an iterative process, where the determined nature-related data by location or geographic area can be paired with, for instance, historical health data, to determine what combination of nature elements and size of geographic radius of examination deliver a greatest correlation (and therefore, accuracy of prediction). In one example, it may be discovered that the best prediction of high cancer rates (for example) in people is related to those who have low park space, tree canopy, low corrected NDVI, and high average AQI within a 1 km radius of their home. Existing scientific literature (and research using the NatureScore(s), can also be factored into the process of optimizing meaning of the NatureScore for a particular user application.

More particularly, once the system has a corrected and labeled data set (i.e., characterized, environmental-related data) of various measurements of natural elements, the data can be compared against a data set of observed outcomes to determine a most accurate predictive method for a specific goal via an iterative, randomized regression analysis. In statistical modeling, regression analysis is a set of statistical processes for estimating the relationships between a dependent variable (often called the "outcome variable") and one or more independent variables ("co-variates" or "features"). For example, a data set of cancer rates of individuals (the "outcome variable") for the last 50 years can be obtained, and the type of natural elements in the environments for which they lived can be determined ("co-variates"). Via an iterative process which randomly tests and corrects the balance of inputs, it can be determined what natural elements most strongly correlate with cancer risk, or the lack thereof. In this example, it may be determined that the best prediction of a high cancer rate in people are for those people who have low park space, low tree canopy, low corrected NDVI, and high average AQI, within a 1 km radius of their home. Using this, it is possible to provide a NatureScore that accurately predicts cancer rates for a specific location or geographic area. In one embodiment, this can be as follows:

(% parkspace within1 km radius of home*parkspace weighting)+(% tree canopy within1 km radius of home*tree canopy weighting)+(Corrected Average NDVI within1 km radius of home*NDVI weighting)+(AQI average within1 km radius of home*AQI weighting)=NatureScore for given location Note that the combination of elements, weighting of elements, and examination area size (i.e., the radius) of nature elements can continually change as the environment-related data changes and/or the observed health outcomes change, in this example.

As another example, a similar process can be implemented to determine how natural areas and/or elements can influence home prices ('outcome variable'). The process can aggregate home sales for the last x number of years and determine the natural elements ('co-variates') around each home. A regression analysis between the observed nature elements and the home price premiums experienced can then dictate a different "NatureScore" for that new goal, that is, a goal of providing the most accurate home price predictions.

Note that, in one or more embodiments, the NatureScore can also be delivered for large areas, such as a census track or entire city. Furthermore, a heat map that shows relative NatureScores over a given area can also provide insight into which areas are nature deficient or abundant for city planning or public health purposes.

As illustrated in FIG. 7, process 730 can include (in one embodiment) generation of the NatureScore using processes and techniques such as described herein 732, which can utilize static location data 734 obtained, for instance, for a given address, geographic area, or latitude-longitude.

In the embodiment of FIG. 7, process 730 provides (e.g., via a cognitive agent and machine learning) a unique NatureScore or GreenScore for the static location, specific to a provided goal 736, such as a user health-related goad. With this data, a NatureDose representation can be obtained using the user's aggregate exposure over a fixed time for one or more dynamic locations 740. In particular, the user's movement or location data and time of exposure 742 can be ascertain by, or provided to, the system (for instance, via one or more mobile devices associated with the user). Additionally, a feedback loop can be established 744, where the system monitors and/or uses one or more user characteristics 750 in ascertaining the NatureDose, as well as providing one or more nature-related recommendations specific to the user to facilitate the user achieving a desired goal, such as a desired nature or health-related goal.

Once a NatureScore is obtained by the system for different geographic areas or locations, the time spent by the user at each location (for instance, via timestamp GPS location data) can be used to determine aggregated exposure to nature over time. While the "NatureScore" is based on static location data, this "NatureDose" is a dynamic score based on time spent by the user in a variety of locations and conditions. The "NatureDose" can be provided by the system as a tracking tool for, for instance, medical research, personal nature exposure goal setting and/or reminders, tracking medical prescriptions for nature exposure, for insurance providers to provide an incentive for members to stay healthy and receive discounts, etc.

For instance, the NatureDose can be determined by the system as the aggregate value of the number of minutes the user spent in a given location multiplied by the NatureScore for that location over a period of time. Over time, the system cognitive agent, or learning agent, can evolve to capture different a variety of time intervals or sampling rates.

In one or more embodiments, user characteristics, or user-related data, can be obtained, for instance, via a smartwatch or similar mobile device, that also tracks biomarkers, such as heartrate, blood oxygen level, heartrate variability, sleep quality, moods, etc. The NatureDose information can be regressed by the system against these biomarkers to determine correlations and make nature-related recommendations specific to the user. The user's GPS data can also allow for the determination of time spent inside versus outside, time spent walking/running/biking, etc. UV exposure levels, given the current weather, etc., can also be obtained to, determine what co-variates may have an influence on the user's observed biomarker outcomes, and based thereon, to make user-specific, nature-related recommendations.

Those skilled in the art will note that numerous inventive aspects and features are disclosed herein, and unless inconsistent, each disclosed aspect or feature is combinable with any other disclosed aspect or feature as desired for a particular application. For instance, embodiments of the present invention described herein include:

A1. A computer-implemented method including: collecting nature information proximate a location; and providing an output to a user characterizing the quantity, quality and/or type of natural areas and/or elements proximate the location.

A2. The computer-implemented method of A1, in which the quantity, quality and/or type of natural areas and/or elements characterized are synthesized into a standardized unit of measurement.

A3. The computer-implemented method of A1 or A2, wherein quantity, quality and/or type of natural areas and/or elements characterized are derived using at least one of: Normalized Difference Vegetation Index, Normalized Difference Water Index, time/date, geolocation (e.g., Lat/Long), nature quality and type, (Park/National Park/Street), current weather/temperature, difference from thermostatic temp, atmospheric pressure, humidity, cloud cover/rain/snow, current smog index, AQI (Air Quality Index) e.g., air particulates/pollutants, light pollution, satellite imagery, vegetation density and type, location characteristics, decibel level, phytoncides.

A4. A computer-implemented method including: collecting information about the location and character of a user's activities; and providing a dynamic output to the user to dynamically monitor the quantity and quality of an individual's exposure to natural areas and/or elements.

A5. The computer-implemented method of A4, wherein static and dynamic data is collected and used to synthesize a nature dose representing a measure of the quantity and quality of an individual's exposure to natural areas and/or elements.

A6. The computer-implemented method of A5, wherein the static data includes at least one of: age, weight, BMI, and skin tone.

A7. The computer-implemented method of A5 or A6, wherein the dynamic data includes at least one of: clothing, glasses, mental state, heart rate, body temp, energy level, etc., Normalized Difference Vegetation Index, Normalized Difference Water Index, time/date, geolocation (e.g., Lat/Long), nature quality and type, (Park/National Park/Street), current weather/temperature, difference from thermostatic temp, atmospheric pressure, humidity, cloud cover/rain/snow, current smog index, AQI (Air Quality Index) e.g., air particulates/pollutants, light pollution, satellite imagery, vegetation density and type, location characteristics, decibel level, phytoncides, other health apps (e.g., steps), activity quality, meditation guidance, prescriptions, health/fitness recommendations, etc.

A8. A computer-implemented method including: obtaining, by one or more processors, environmental-related data for a geographic area from one or more data sources; performing data analysis on the environmental-related data and automatically manipulating, based on the data analysis, the environmental-related data to obtain characterized environmental-related data which facilitates generating a nature-related score for the geographic area; using the characterized environmental-related data in automatically generating a nature-related score for the geographic area; and providing, by the one or more processors, the nature-related score for the geographic area to facilitate performance of an action based on the nature-related score.

A9. The computer-implemented method of A8, further including: obtaining, by the one or more processors, user-related data for a user; and based on the nature-related score for the geographic area and the user-related data, providing, by the one or more processors, a nature-related recommendation specific to the user, where the action is a user action based on the nature-related recommendation.

A10. The computer-implemented method of A9, wherein the user-related data includes time data representative of time spent by the user at the geographic area, and wherein the computer-implemented method further includes: generating, by the one or more processors, a nature dose value for the user using the nature-related score for the geographic area and the time data, wherein the nature-related recommendation specific to the user is based, at least in part, on the generated nature dose value for the user.

A11. The computer-implemented method of A10, further including collecting, by the one or more processors, the user-related data, wherein the user-related data includes location and character data on the user's activities over a period of time, and wherein generating the nature dose value for the user includes generating the nature dose value to be representative of the quantity/quality of the user's exposure to natural areas or elements during the period of time.

A12. The computer-implemented method of A9, A10 or A11, wherein providing the nature-related recommendation specific to the user includes using machine learning and generating the nature-related recommendation specific to the user based, at least in part, on the nature-related score and the user-related data.

A13. The computer-implemented method of A9, A10, A11 or A12, wherein the user-related data is received, at least in part, from one or more devices of the user which obtain user biological data, and wherein the nature-related recommendation specific to the user is based, at least in part, on the user biological data.

A14. The computer-implemented method of A8, A9, A10, A11, A12 or A13, further including receiving, by the one or more processors, a reference data set, and wherein automatically generating the nature-related score for the geographic area includes correlating, via data analysis, the nature-related score and the reference data set.

A15. The computer-implemented method of A14, wherein the correlating includes using machine learning in tying the nature-related score to the reference data set.

A16. The computer-implemented method of A14 or A15, wherein the reference data set includes at least one of a health data set, a real estate-related data set, an economic-related data set, or a temperature data set.

A17. The computer-implemented method of A8, A9, A10, A11, A12, A13, A14, A15 or A16, wherein the obtaining environmental-related data for the geographical area includes obtaining, by the one or more processors, environmental-related data for the geographical area from the plurality of data sources, and wherein manipulating the environmental-related data includes merging the environmental-related data from the plurality of data sources in obtaining the characterized environmental-related data that facilitates generating the nature-related score for the geographic area.

A18. The computer-implemented method of A17, wherein the environmental-related data from the plurality of data sources includes two or more environmental-related data from the group consisting of: Normalized Different Vegetation Index (NDVI) data, Normalized Difference Water Index (NDWI) data, satellite image data, nature quality data, nature type data, vegetation density data, vegetation type data, geographic characteristic data, precipitation-related data, and climate-related data.

B1. A computer system, the computer system including: a memory; one or more processors in communication with the memory; and program code executable by the one or mor more processors via the memory to perform a method including: collecting nature information proximate a location; and providing an output to a user characterizing the quantity, quality and/or type of natural areas and/or elements proximate the location.

B2. The computer system of B1, in which the quantity, quality and/or type of natural areas and/or elements characterized are synthesized into a standardized unit of measurement.

B3. The computer system of B1 or B2, wherein quantity, quality and/or type of natural areas and/or elements characterized are derived using at least one of: Normalized Difference Vegetation Index, Normalized Difference Water Index, time/date, geolocation (e.g., Lat/Long), nature quality and type, (Park/National Park/Street), current weather/temperature, difference from thermostatic temp, atmospheric pressure, humidity, cloud cover/rain/snow, current smog index, AQI (Air Quality Index) e.g., air particulates/pollutants, light pollution, satellite imagery, vegetation density and type, location characteristics, decibel level, phytoncides.

B4. A computer system, the computer system including: a memory; one or more processors in communication with the memory; and program code executable by the one or mor more processors via the memory to perform a method including: collecting information about the location and character of a user's activities; and providing a dynamic output to the user to dynamically monitor the quantity and quality of an individual's exposure to natural areas and/or elements.

B5. The computer system of B4, wherein static and dynamic data is collected and used to synthesize a nature dose representing a measure of the quantity and quality of an individual's exposure to natural areas and/or elements.

B6. The computer system of B5, wherein the static data includes at least one of: age, weight, BMI, and skin tone.

B7. The computer system of B5 or B6, wherein the dynamic data includes at least one of: clothing, glasses, mental state, heart rate, body temp, energy level, etc., Normalized Difference Vegetation Index, Normalized Difference Water Index, time/date, geolocation (e.g., Lat/Long), nature quality and type, (Park/National Park/Street), current weather/temperature, difference from thermostatic temp, atmospheric pressure, humidity, cloud cover/rain/snow, current smog index, AQI (Air Quality Index) e.g., air particulates/pollutants, light pollution, satellite imagery, vegetation density and type, location characteristics, decibel level, phytoncides, other health apps (e.g., steps), activity quality, meditation guidance, prescriptions, health/fitness recommendations, etc.

B8. A computer system, the computer system including: a memory; one or more processors in communication with the memory; and program code executable by the one or mor more processors via the memory to perform a method including: obtaining, via the one or more processors, environmental-related data for a geographic area from one or more data sources; performing data analysis on the environmental-related data and automatically manipulating, based on the data analysis, the environmental-related data to obtain characterized environmental-related data which facilitates generating a nature-related score for the geographic area; using the characterized environmental-related data in automatically generating a nature-related score for the geographic area; and providing, by the one or more processors, the nature-related score for the geographic area to facilitate performance of an action based on the nature-related score.

B9. The computer system of B8, further including: obtaining, by the one or more processors, user-related data for a user; and based on the nature-related score for the geographic area and the user-related data, providing, by the one or more processors, a nature-related recommendation specific to the user, where the action is a user action based on the nature-related recommendation.

B10. The computer system of B9, wherein the user-related data includes time data representative of time spent by the user at the geographic area, and wherein the computer-implemented method further includes: generating, by the one or more processors, a nature dose value for the user using the nature-related score for the geographic area and the time data, wherein the nature-related recommendation specific to the user is based, at least in part, on the generated nature dose value for the user.

B11. The computer system of B10, further including collecting, by the one or more processors, the user-related data, wherein the user-related data includes location and character data on the user's activities over a period of time, and wherein generating the nature dose value for the user includes generating the nature dose value to be representative of the quantity/quality of the user's exposure to natural areas or elements during the period of time.

B12. The computer system of B9, B10 or B11, wherein providing the nature-related recommendation specific to the user includes using machine learning and generating the nature-related recommendation specific to the user based, at least in part, on the nature-related score and the user-related data.

B13. The computer system of B9, B10, B11 or B12, wherein the user-related data is received, at least in part, from one or more devices of the user which obtain user biological data, and wherein the nature-related recommendation specific to the user is based, at least in part, on the user biological data.

B14. The computer system of B8, B9, B10, B11, B12 or B13, further including receiving, by the one or more processors, a reference data set, and wherein automatically generating the nature-related score for the geographic area includes correlating, via data analysis, the nature-related score and the reference data set.

B15. The computer system of B14, wherein the correlating includes using machine learning in tying the nature-related score to the reference data set.

B16. The computer system of B14 or B15, wherein the reference data set includes at least one of a health data set, a real estate-related data set, an economic-related data set, or a temperature data set.

B17. The computer system of B8, B9, B10, B11, B12, B13, B14, B15 or B16, wherein the obtaining environmental-related data for the geographical area includes obtaining, by the one or more processors, environmental-related data for the geographical area from the plurality of data sources, and wherein manipulating the environmental-related data includes merging the environmental-related data from the plurality of data sources in obtaining the characterized environmental-related data that facilitates generating the nature-related score for the geographic area.

B18. The computer system of B17, wherein the environmental-related data from the plurality of data sources includes two or more environmental-related data from the group consisting of: Normalized Different Vegetation Index (NDVI) data, Normalized Difference Water Index (NDWI) data, satellite image data, nature quality data, nature type data, vegetation density data, vegetation type data, geographic characteristic data, precipitation-related data, and climate-related data.

C1. A computer program product including a computer-readable storage medium having computer-readable code embodied therewith, the computer-readable code being executable by one or more processors to cause the one or more processors to: collect nature information proximate a location; and provide an output to a user characterizing the quantity, quality and/or type of natural areas and/or elements proximate the location.

C2. The computer program product of C1, in which the quantity, quality and/or type of natural areas and/or elements characterized are synthesized into a standardized unit of measurement.

C3. The computer program product of C1 or C2, wherein quantity, quality and/or type of natural areas and/or elements characterized are derived using at least one of: Normalized Difference Vegetation Index, Normalized Difference Water Index, time/date, geolocation (e.g., Lat/Long), nature quality and type, (Park/National Park/Street), current weather/temperature, difference from thermostatic temp, atmospheric pressure, humidity, cloud cover/rain/snow, current smog index, AQI (Air Quality Index) e.g., air particulates/pollutants, light pollution, satellite imagery, vegetation density and type, location characteristics, decibel level, phytoncides.

C4. A computer program product including a computer-readable storage medium having computer-readable code embodied therewith, the computer-readable code being executable by one or more processors to cause the one or more processors to: collect information about the location and character of a user's activities; and provide a dynamic output to the user to dynamically monitor the quantity and quality of an individual's exposure to natural areas and/or elements.

C5. The computer program product of C4, wherein static and dynamic data is collected and used to synthesize a nature dose representing a measure of the quantity and quality of an individual's exposure to natural areas and/or elements.

C6. The computer program product of C5, wherein the static data includes at least one of: age, weight, BMI, and skin tone.

C7. The computer program product of C5 or C6, wherein the dynamic data includes at least one of: clothing, glasses, mental state, heart rate, body temp, energy level, etc., Normalized Difference Vegetation Index, Normalized Difference Water Index, time/date, geolocation (e.g., Lat/Long), nature quality and type, (Park/National Park/Street), current weather/temperature, difference from thermostatic temp, atmospheric pressure, humidity, cloud cover/rain/snow, current smog index, AQI (Air Quality Index) e.g., air particulates/pollutants, light pollution, satellite imagery, vegetation density and type, location characteristics, decibel level, phytoncides, other health apps (e.g., steps), activity quality, meditation guidance, prescriptions, health/fitness recommendations, etc.

C8. A computer program product including a computer-readable storage medium having computer-readable code embodied therewith, the computer-readable code being executable by one or more processors to cause the one or more processors to: obtain environmental-related data for a geographic area from one or more data sources; perform data analysis on the environmental-related data and automatically manipulate, based on the data analysis, the environmental-related data to obtain characterized environmental-related which facilitates generating a nature-related score for the geographic area; use the characterized environmental-related data in automatically generating a nature-related score for the geographic area; and provide the nature-related score for the geographic area to facilitate performance of an action based on the nature-related score.

C9. The computer program product of C8, further including: obtaining, by the one or more processors, user-related data for a user; and based on the nature-related score for the geographic area and the user-related data, providing, by the one or more processors, a nature-related recommendation specific to the user, where the action is a user action based on the nature-related recommendation.

C10. The computer program product of C9, wherein the user-related data includes time data representative of time spent by the user at the geographic area, and wherein the computer-implemented method further includes: generating, by the one or more processors, a nature dose value for the user using the nature-related score for the geographic area and the time data, wherein the nature-related recommendation specific to the user is based, at least in part, on the generated nature dose value for the user.

C11. The computer program product of C10, further including collecting, by the one or more processors, the user-related data, wherein the user-related data includes location and character data on the user's activities over a period of time, and wherein generating the nature dose value for the user includes generating the nature dose value to be representative of the quantity/quality of the user's exposure to natural areas or elements during the period of time.

C12. The computer program product of C9, C10 or C11, wherein providing the nature-related recommendation specific to the user includes using machine learning and generating the nature-related recommendation specific to the user based, at least in part, on the nature-related score and the user-related data.

C13. The computer program product of C9, C10, C11 or C12, wherein the user-related data is received, at least in part, from one or more devices of the user which obtain user biological data, and wherein the nature-related recommendation specific to the user is based, at least in part, on the user biological data.

C14. The computer program product of C8, C9, C10, C11, C12 or C13, further including receiving, by the one or more processors, a reference data set, and wherein automatically generating the nature-related score for the geographic area includes correlating, via data analysis, the nature-related score and the reference data set.

C15. The computer program product of C14, wherein the correlating includes using machine learning in tying the nature-related score to the reference data set.

C16. The computer program product of C14 or C15, wherein the reference data set includes at least one of a health data set, a real estate-related data set, an economic-related data set, or a temperature data set.

C17. The computer program product of C8, C9, C10, C11, C12, C13, C14, C15, C16 or C17, wherein the obtaining environmental-related data for the geographical area includes obtaining, by the one or more processors, environmental-related data for the geographical area from the plurality of data sources, and wherein manipulating the environmental-related data includes merging the environmental-related data from the plurality of data sources in obtaining the characterized environmental-related data that facilitates generating the nature-related score for the geographic area.

C18. The computer program product of C17, wherein the environmental-related data from the plurality of data sources includes two or more environmental-related data from the group consisting of: Normalized Different Vegetation Index (NDVI) data, Normalized Difference Water Index (NDWI) data, satellite image data, nature quality data, nature type data, vegetation density data, vegetation type data, geographic characteristic data, precipitation-related data, and climate-related data.

Figure 8:
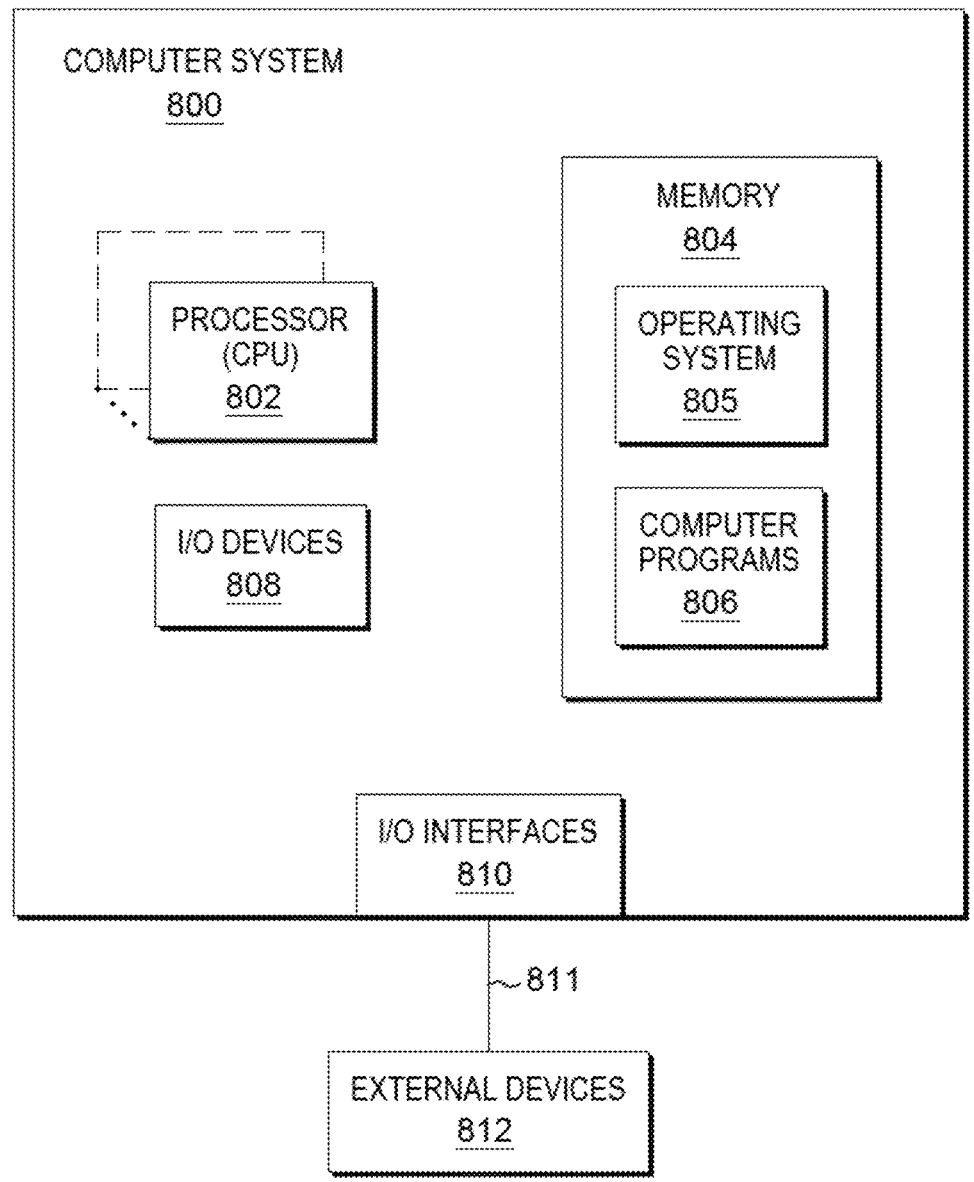
FIG. 8 depicts one embodiment of a computer system and associated devices to incorporate and/or use one or more aspects of the present invention.

By way of further example, FIG. 8 depicts a computer system 800 in communication with external device(s) 812, which can be used to implement one or more aspects disclosed herein. Computer system 800 includes one or more processor(s) 802, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 802 can also include one or more registers to be used by one or more of the functional components. Computer system 800 also includes a memory 804, input/output (I/O) devices 808, and I/O interfaces 810, which may be coupled to processor(s) 802 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and Peripheral Component Interconnect (PCI).

Memory 804 can be, or include, main or system memory (e.g. Random Access Memory) used in the execution of program instructions, a storage device(s) such as hard drive(s), flash media, or optical media as examples, and/or cache memory, as examples. Memory 804 can include, for instance, a cache, such as a shared cache, which may be coupled to local caches (examples include L1 cache, L2 cache, etc.) of processor(s) 802. Additionally, memory 804 can be, or include, at least one computer program product having a set (e.g., at least one) of program modules, instructions, code or the like that is/are configured to carry out functions of embodiments described herein when executed by one or more processors.

Memory 804 can store an operating system 805 and other computer programs 806, such as one or more computer programs/applications that execute to perform aspects described herein. Specifically, programs/applications can include computer readable program instructions that can be configured to carry out functions of embodiments of aspects described herein.

Examples of I/O devices 808 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device can be incorporated into the computer system as shown, though in some embodiments an I/O device can be regarded as an external device (812) coupled to the computer system through one or more I/O interfaces 810.

Computer system 800 can communicate with one or more external devices 812 via one or more I/O interfaces 810. Example external devices include a keyboard, a display, one or more data sensors, and/or any other devices that (for instance) enable a user to interact with computer system 800. Other example external devices include any device that enables computer system 800 to communicate with one or more other computing systems or peripheral devices. A network interface/adapter is an example I/O interface that enables computer system 800 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems. (BLUETOOTH® is a registered trademark of Bluetooth SIG, Inc., Kirkland, Washington, U.S.A.)

Communication between I/O interfaces 810 and external devices 812 can occur across wired and/or wireless communications link(s) 811, such as Ethernet-based wired or wireless connections. Example wireless connections include cellular, Wi-Fi, Bluetooth®, proximity-based, near-field, or other types of wireless connections. More generally, communications link(s) 811 can be any appropriate wireless and/or wired communication link(s) for communicating data between systems and/or devices to facilitate one or more aspects disclosed herein.

A particular external device(s) 812 can include one or more data storage devices, which can store one or more programs, one or more computer readable program instructions, and/or data, etc. Computer system 800 can include and/or be coupled to and in communication with (e.g. as an external device of the computer system) removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk, and/or an optical disk drive for reading from or writing to a removable, non-volatile optical disk, such as a CD-ROM, DVD-ROM or other optical media.

Computer system 800 can be operational with numerous other general purpose or special purpose computing system environments or configurations. Computer system 800 can take any of various forms, well-known examples of which include, but are not limited to, personal computer (PC) system(s), server computer system(s), thin client(s), thick client(s), workstation(s), laptop(s), handheld device(s), mobile device(s)/computer(s), such as smartphone(s), tablet(s), and wearable device(s), multiprocessor system(s), microprocessor-based system(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

As will be appreciated by one skilled in the art, control aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, control aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may be any computer readable medium that can communicate, propagate, or transport a program for use by or in connection with an instruction execution system, apparatus or device and a computer readable storage medium can be any non-transitory computer readable storage medium.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

In one example, a computer program product includes, for instance, one or more computer readable storage media to store computer readable program code means or logic thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out control and/or calibration operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, on the user's personal device (e.g., phone, tablet, wearable), as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to block diagrams of methods, apparatus (systems) and computer program products according to embodiments of the invention. It will be understood that the control block of the diagram can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus (e.g., mobile device/phone), or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagram in the figure illustrates the architecture, functionality, and operation of possible implementations of systems, methods and computer program products according to various embodiments of the present invention. In this regard, one or more blocks in the diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that one or more blocks of the diagram can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure (including, e.g., Internet/cloud/IOT resources and/or a mobile device) operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, the network of nodes can include additional nodes, and the nodes can be the same or different from those described herein. Also, many types of communications interfaces may be used.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, mobile device/phone, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of the invention and the practical application, and to enable others of ordinary skill in the art to understand the invention through various embodiments and the various modifications thereto which are dependent on the particular use contemplated.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method comprising:
   obtaining across a network, by one or more processors, nature-related data for a geographic area of interest from one or more remote data sources;
   data analyzing, by the one or more processors, the nature-related data;
   automatically transforming by the one or more processors, based on the data analyzing, the nature-related data into characterized nature-related data representative of at least one of an amount of nature or quality of nature within the geographic area of interest to facilitate generating a nature-related score for the geographic area;
   automatically generating, by the one or more processors, using the characterized nature-related data, a nature-related score for the geographic area of interest based on the at least one of the amount of nature or quality of nature within the geographic area of interest; and outputting, by the one or more processors, the nature-related score for the geographic area to facilitate performing an action based on the nature-related score.

2. The method of claim 1, further comprising:
obtaining, by the one or more processors, user-related data for a user; and
generating, by the one or more processors, based on the nature-related score for the geographic area and the user-related data, nature-related information data specific to the user.

3. The method of claim 2, wherein the user-related data includes time data representative of time spent by the user at the geographic area, and wherein the method further comprises:
generating, by the one or more processors, a nature dose value for the user using the nature-related score for the geographic area and the time data.

4. The method of claim 3, further comprising:
collecting, by the one or more processors, the user-related data, wherein the user-related data includes geographic location and nature-related character data on the user's activities over a period of time; and
wherein generating the nature dose value for the user includes generating the nature dose value as representative of the quantity/quality of the user's exposure to natural areas or natural elements during the period of time.

5. The method of claim 2, further comprising generating, via a machine learning model, a nature-related recommendation specific to the user based, at least in part, on the nature-related score and the user-related data, and wherein the outputting comprises outputting the nature-related recommendation specific to the user to a mobile device of the user.

6. The method of claim 5, wherein the user-related data is received, at least in part, from one or more devices of the user which obtain user biological data, and wherein the generated nature-related recommendation specific to the user is based, at least in part, on the user biological data received from the one or more devices of the user.

7. The method of claim 1, further comprising receiving, by the one or more processors, a reference data set, and wherein automatically generating the nature-related score for the geographic area of interest includes automatically correlating, via data analysis, the nature-related score and the reference data set.

8. The method of claim 7, wherein the automatically correlating comprises using machine learning in digitally tying the nature-related score to the reference data set.

9. The method of claim 8, wherein the reference data set comprises at least one of a health data set, a real estate data set, an economic-related data set, an urban heat data set, or a temperature data set.

10. The method of claim 1, wherein the obtaining nature-related data for the geographic area of interest comprises obtaining, by the one or more processors, nature-related data for the geographic area of interest from a plurality of data sources, and wherein automatically transforming the nature-related data comprises merging nature-related data from the plurality of data sources in obtaining the characterized nature-related data that facilitates generating the nature-related score for the geographic area.

11. The method of claim 10, wherein the nature-related data from the plurality of data sources comprises two or more types of nature-related data from the group consisting of: Normalized Difference Vegetation Index (NDVI) data, Normalized Difference Water Index (NDWI) data, satellite image data, nature quality data, nature type data, vegetation density data, vegetation type data, geographic characteristic data, precipitation-related data, heat map data, temperature-related data, and climate-related data.

12. A computer system comprising:
a memory;
one or more processors in communication with the memory; and
program code executable by the one or more processors via the memory to perform a method comprising:
obtaining across a network, by the one or more processors, nature-related data for a geographic area of interest from one or more remote data sources;
data analyzing, by the one or more processors, the nature-related data;
automatically transforming by the one or more processors, based on the data analyzing, the nature-related data into characterized nature-related data representative of at least one of an amount of nature or quality of nature within the geographic area of interest to facilitate generating a nature-related score for the geographic area;
automatically generating, by the one or more processors, using the characterized nature-related data, generating a nature-related score for the geographic area of interest based on the at least one of the amount of nature or quality of nature within the geographic area of interest; and
outputting, by the one or more processors, the nature-related score for the geographic area to facilitate performing an action based on the nature-related score.

13. The computer system of claim 12, wherein the method further comprises:
obtaining, by the one or more processors, user-related data for a user; and
generating, by the one or more processors, based on the nature-related score for the geographic area and the user-related data, nature-related information data specific to the user.

14. The computer system of claim 13, wherein the user-related data includes time data representative of time spent by the user at the geographic area, and wherein the method further comprises:
generating, by the one or more processors, a nature dose value for the user using the nature-related score for the geographic area and the time data.

15. The computer system of claim 14, wherein the method further comprises:
collecting, by the one or more processors, the user-related data, wherein the user-related data includes geographic location and nature-related character data on the user's activities over a period of time; and
wherein generating the nature dose value for the user includes generating the nature dose value as representative of the quantity/quality of the user's exposure to natural areas or natural elements during the period of time.

16. The computer system of claim 15, wherein the method further comprising generating, via a machine learning model, a nature-related recommendation specific to the user based, at least in part, on the nature-related score and the user-related data, and wherein the outputting comprises outputting the nature-related recommendation specific to the user to a mobile device of the user.

17. A computer program product for facilitating nature-related data processing, the computer program product comprising:
- at least one computer-readable storage medium readable by a processing circuit and storing instructions for performing a method, the method comprising:
  - obtaining across a network, by one or more processors, nature-related data for a geographic area of interest from one or more remote data sources;
  - data analyzing, by the one or more processors, the nature-related data;
  - automatically transforming by the one or more processors, based on the data analyzing, the nature-related data into characterized nature-related data representative of at least one of an amount of nature or quality of nature within the geographic area of interest to facilitate generating a nature-related score for the geographic area;
  - automatically generating, by the one or more processors, using the characterized nature-related data, a nature-related score for the geographic area of interest based on the at least one of the amount of nature or quality of nature within the geographic area of interest; and
  - outputting, by the one or more processors, the nature-related score for the geographic area to facilitate performing an action based on the nature-related score.

18. The computer program product of claim 17, further comprising:
- obtaining, by the one or more processors, user-related data for a user; and
- generating, by the one or more processors, based on the nature-related score for the geographic area and the user-related data, nature-related information data specific to the user.

19. The computer program product of claim 18, wherein the user-related data includes time data representative of time spent by the user at the geographic area, and wherein the method further comprises:
- generating, by the one or more processors, a nature dose value for the user using the nature-related score for the geographic area and the time data.

20. The computer program product of claim 19, further comprising:
- collecting, by the one or more processors, the user-related data, wherein the user-related data includes geographic location and nature-related character data on the user's activities over a period of time; and
- wherein generating the nature dose value for the user includes generating the nature dose value as representative of the quantity/quality of the user's exposure to natural areas or natural elements during the period of time.

\* \* \* \* \*